US012769693B2

United States Patent

(12) United States Patent
Chauhan et al.

(10) Patent No.: US 12,769,693 B2
(45) Date of Patent: Oct. 20, 2026

(54) ENABLING UNIVERSAL CORE MOTHERBOARD WITH FLEXIBLE INPUT-OUTPUT PORTS

(71) Applicant: Intel Corporation, Santa Clara, CA (US)

(72) Inventors: Shailendra Singh Chauhan, Bangalore (IN); Nirmala Bailur, Bangalore (IN); Reza M. Zamani, Hillsboro, OR (US); Jackson Chung Peng Kong, Penang (MY); Charuhasini Sunder Raman, Bangalore (IN); Venkataramani Gopalakrishnan, Folsom, CA (US); Chuen Ming Tan, Penang (MY); Sreejith Satheesakurup, Cherthala (IN); Karthi Kaliswamy, Bangalore (IN); Venkata Mahesh Gunnam, Bangalore (IN); Yi Jen Huang, Kaohsiung City (TW); Kie Woon Lim, Penang (MY); Dhinesh Sasidaran, Penang (MY); Pik Shen Chee, Penang (MY); Venkataramana Kotakonda, Bangalore (IN); Kunal A. Shah, Bangalore (IN); Ramesh Vankunavath, Bangalore (IN); Siva Prasad Jangili Ganga, Jagityal (IN); Ravali Pampala, Bangalore (IN); Uma Medepalli, El Dorado, CA (US); Tomer Savariego, Lavon (IL); Naznin Banu Wahab, Bangalore (IN); Sindhusha Kodali, Bangalore (IN); Manjunatha Venkatarauyappa, Bangalore (IN); Surendar Jeevarathinam, Bangalore (IN); Madhura Shetty, Udupi (IN); Deepak Sharma, Bangalore (IN); Rohit Sharad Mahajan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 17/950,840

(22) Filed: Sep. 22, 2022

(65) Prior Publication Data

US 2024/0104043 A1 Mar. 28, 2024

(51) Int. Cl.
*G06F 13/40* (2006.01)
*G06F 13/42* (2006.01)

(52) U.S. Cl.
CPC ...... *G06F 13/4045* (2013.01); *G06F 13/4068* (2013.01); *G06F 13/4282* (2013.01);
(Continued)

(58) Field of Classification Search
None
See application file for complete search history.

(56) References Cited

U.S. PATENT DOCUMENTS 9,645,962 B2 * 5/2017 Voto ...................... G06F 13/385
10,380,049 B2 * 8/2019 Lin ..................... G06F 13/4282
(Continued)

OTHER PUBLICATIONS

Extended European Search Report issued Jan. 23, 2024 for EP Application No. 23183037.3, 9 pages.
(Continued)

*Primary Examiner* — Henry Tsai
*Assistant Examiner* — Christopher A Bartels
(74) *Attorney, Agent, or Firm* — Schwabe, Williamson & Wyatt, P.C.

(57) ABSTRACT

Embodiments herein relate to a module which can be inserted into or removed from a computing device by a user. The module includes an input-output port which is config-
(Continued)

ured for a desired specification, such as USB-A, USB-C, Thunderbolt, DisplayPort or HDMI. The port can be provided on an expansion card such as an M.2 card for communicating with a host platform. The host platform can communicate with different types of modules in a standardized way so that complexity and costs are reduced. In another aspect, with a dual port module, the host platform can concurrently send/receive power through one port and send/receive data from the other port.

20 Claims, 24 Drawing Sheets

(52) U.S. Cl.
CPC ................ *G06F 2213/0026* (2013.01); *G06F 2213/0042* (2013.01)

(56) References Cited

U.S. PATENT DOCUMENTS

| | | | | |
|---|---|---|---|---|
| 10,534,741 | B2 * | 1/2020 | So | G06F 13/4022 |
| 10,656,676 | B2 * | 5/2020 | Huang | G06F 13/4081 |
| 11,967,886 | B2 * | 4/2024 | Sohn | F16H 19/043 |
| 2012/0028484 | A1 * | 2/2012 | Chen | H01R 13/4534 439/136 |
| 2012/0162830 | A1 * | 6/2012 | Anderson | G06F 13/4072 361/42 |
| 2016/0350251 | A1 * | 12/2016 | Lee | G06F 13/4282 |
| 2016/0378704 | A1 * | 12/2016 | Adamson | G06F 13/364 710/104 |
| 2017/0017595 | A1 * | 1/2017 | Schnell | G06F 13/4286 |
| 2017/0242804 | A1 * | 8/2017 | Voor | G06F 3/023 |
| 2017/0286343 | A1 * | 10/2017 | Rozic | G06F 13/385 |
| 2019/0042505 | A1 * | 2/2019 | Subbareddy | G06F 13/14 |
| 2019/0302858 | A1 * | 10/2019 | Ali | G06F 1/186 |
| 2021/0263875 | A1 * | 8/2021 | Lin | G06F 13/4221 |
| 2022/0197364 | A1 * | 6/2022 | Gopalakrishnan | G06F 1/3253 |
| 2023/0015249 | A1 * | 1/2023 | Patel | G06F 1/1679 |
| 2023/0299685 | A1 * | 9/2023 | Joshi | H02M 3/33507 |
| 2024/0330210 | A1 * | 10/2024 | Subramanian | G06F 13/12 |

OTHER PUBLICATIONS

Office Action issued Dec. 4, 2024 for EP Application No. 23183037.3, 6 pages.

PCI Express, "PCI Express Base Specification Revision 3.0," Nov. 10, 2010, 860 pages.

PCI Express, "PCI Express", Sep. 15, 2022, retrieved from the Internet on Jan. 9, 2024: URL:https://en.wikipedia.org/w/index.php?title=PCI_Express&oldid=1110484990, 23 pages.

* cited by examiner

| C1 | C2 | C3 | C4 | C5 | C6 | C7 | C8 | C9 | C10 | C11 | C12 | C13 |
|---|---|---|---|---|---|---|---|---|---|---|---|---|
| SIDE-A | | | | | | | | | | | | |
| PIN | Type-A Conn Module | IO | IO VL | HDR TBT Module | IO | IO VL | HDMI Module | IO | IO VL | [illegible] | [illegible] | Description |
| 1 | GND | P | - | GND | P | - | GND | P | - | P | - | |
| 3 | GND | | - | GND | | - | GND | | - | | - | |
| 5 | USB2_P1_N | Bi | HSIO | USB2_P1_N | Bi | HSIO | - | - | - | - | - | USB2 for Type-C/A |
| 7 | USB2_P1_P | | | USB2_P1_P | | | - | | | | | |
| 9 | GND | P | - | GND | P | - | GND | P | - | P | - | |
| 11 | SS_Tx1_P1_N | I | HSIO | SS_Tx1_P1_N | I | HSIO | HDMI_TX3_DN | I | HSIO | I | HSIO | HSIO for TBT/HDMI/DP |
| 13 | SS_Tx1_P1_P | | | SS_Tx1_P1_P | | | HDMI_TX3_DP | | | | | |
| 15 | GND | P | - | GND | P | - | GND | P | - | P | - | |
| 17 | SS_Rx1_P1_N | O | HSIO | SS_Rx1_P1_N | O | HSIO | HDMI_TX2_DN | I | HSIO | I | HSIO | HSIO for TBT/HDMI/DP |
| 19 | SS_Rx1_P1_P | | | SS_Rx1_P1_P | | | HDMI_TX2_DP | | | | | |
| 21 | GND | P | - | GND | P | - | GND | P | - | P | - | |
| 23 | SS_Rx2_P1_N | O | HSIO | SS_Rx2_P1_N | O | HSIO | HDMI_TX1_DN | I | HSIO | I | HSIO | HSIO for TBT/HDMI/DP |
| 25 | SS_Rx2_P1_P | | | SS_Rx2_P1_P | | | HDMI_TX1_DP | | | | | |
| 27 | GND | P | - | GND | P | - | GND | P | - | P | - | |
| 29 | SS_Tx2_P1_N | I | HSIO | SS_Tx2_P1_N | I | HSIO | HDMI_TX0_DN | I | HSIO | I | HSIO | HSIO for TBT/HDMI/DP |
| 31 | SS_Tx2_P1_P | | | SS_Tx2_P1_P | | | HDMI_TX0_DP | | | | | |
| 33 | GND | - | - | GND | P | - | GND | P | - | P | - | |
| 35 | - | - | - | AUX_DN | Bi | - | - | - | - | Bi | 3.3 | Aux for DP connector |
| 37 | - | | | AUX_DP | | | - | | | | | |
| 39 | GND | P | - | GND | P | - | GND | P | - | P | - | |
| 41 | - | - | - | - | - | - | HPD | O | 1.8 | O | 1.8 | HPD DP from HDMI & DP |
| 43 | - | - | - | - | - | - | - | Bi | 3.3 | I | 1.8 | Utility signal(HDMI)/eDP BKLT CTRL |
| 45 | GND | P | - | GND | P | - | GND | P | - | P | - | |
| 47 | - | - | - | FORCE_PWR | - | - | - | O | 3.3 | O | ? | CEC signal from HDMI |
| 49 | - | - | - | - | - | - | - | - | - | - | - | - |
| 51 | GND | P | - | GND | P | - | GND | P | - | P | - | |
| 53 | TYPE-A_OC# | O | OD | - | - | - | - | - | - | I | 1.8 | OC indication for Type-A VBUS/HDR LS power enable |
| 55 | TYPE-A_VBUS_EN | I | 1.8 | - | - | - | - | - | - | I | 1.8 | BUS enable for Type-A/eDP_BKLT_E |
| 57 | GND | P | - | GND | P | - | GND | P | - | P | - | |
| KEY-M (No Connect) | | | | | | | | | | | | |
| 67 | - | - | - | SLP_S3# | I | 1.8 | - | - | - | - | - | S3 indication signal from platform |
| 69 | - | - | - | PLTRST#/RESET# | I | 1.8 | - | - | - | - | - | Platform reset out signal |
| 71 | GND | P | - | GND | P | - | GND | P | - | P | - | |
| 73 | - | - | - | PROCHOT# | I | 3.3 | - | - | - | - | - | Prochot input from platform |
| 75 | GND | P | - | GND | P | - | GND | P | - | P | - | |

Fig. 8A

| C1 | C2 | C3 | C4 | C5 | C6 | C7 | C8 | C9 | C10 | C11 | C12 | C13 |
|---|---|---|---|---|---|---|---|---|---|---|---|---|
| SIDE B | | | | | | | | | | | | |
| Pin | Type A Conn Module | IO | IO V | HBR TBT Module | IO | IO V | HDMI Module | IO | IO V | [illegible] | [illegible] | Description |
| 2 | - | - | - | +V_CHGR_VIN | O | - | - | - | - | I | - | 5A Power to charger input |
| 4 | - | - | - | +V_CHGR_VIN | O | - | - | - | - | I | - | |
| 6 | - | - | - | +V_CHGR_VIN | O | - | - | - | - | - | - | |
| 8 | - | - | - | +V_CHGR_VIN | O | - | - | - | - | - | - | |
| 10 | - | - | - | +V_CHGR_VIN | O | - | - | - | - | - | - | |
| 12 | - | - | - | - | - | - | - | - | - | - | - | CC signals for RVP use case |
| 14 | - | - | - | - | - | - | - | - | - | - | - | |
| 16 | - | - | - | - | - | - | - | - | - | - | - | NC |
| 18 | 1.8V_A | I | - | 1.8V_A | I | - | 1.8V_A | I | - | I | - | Voltage for I2C/IO's |
| 20 | 1.8V_A | I | - | 1.8V_A | I | - | 1.8V_A | I | - | I | - | |
| 22 | 3.3V_A | I | - | 3.3V_A | I | - | 3.3V_A | I | - | I | - | 3.3V for DP & IO's |
| 24 | 3.3V_A | | - | 3.3V_A | | - | 3.3V_A | | - | | - | |
| 26 | - | - | - | - | - | - | 3.3V_S0 | I | - | I | - | 3.3V S0 for the EDP/HDMI RDRVR |
| 28 | VBUS | I | - | 5V_STNDBY | I | - | 5V_S0 | I | - | - | - | VBUS for connector or 5V in to PD/5V S0 Rail for HDMI |
| 30 | VBUS | I | - | 5V_STNDBY | I | - | - | - | - | - | - | |
| 32 | VBUS | I | - | 5V_STNDBY | I | - | - | - | - | - | - | |
| 34 | MODULE_DET# | O | 1.8 | MODULE_DET# | O | 1.8 | MODULE_DET# | O | 1.8 | O | 1.8 | Module detection output |
| 36 | - | - | - | vPRO_SML_SCL | I | 1.8 | - | - | - | - | - | CPU to HBR SML for vPRO |
| 38 | - | - | - | vPRO_SML_SDA | BI | 1.8 | - | - | - | - | - | |
| 40 | - | - | - | PD2PMC_SML_SCL | I | 1.8 | - | - | - | - | - | PD to CPU PMC SML/m.2 to Mux SBU (RVP) |
| 42 | - | - | - | PD2PMC_SML_SDA | BI | 1.8 | - | - | - | - | - | |
| 44 | - | - | - | PD2PMC_SML_INT# | O | 1.8 | - | - | - | - | - | PD to CPU PMC SML |
| 46 | EC2EPROM_I2C_SCL | I | 3.3 | EC2PD/EPROM_I2C_SCL | I | 3.3 | EC2EPROM_I2C_SCL | I | 3.3 | I | 3.3 | EC to PD/EEPROM |
| 48 | EC2EPROM_I2C_SDA | O | 3.3 | EC2PD/EPROM_I2C_SDA | BI | 3.3 | EC2EPROM_I2C_SDA | O | 3.3 | O | 3.3 | |
| 50 | EC2EPROM_INT# | O | 3.3 | EC2PD/EPROM_INT# | O | 3.3 | EC2EPROM_INT# | O | 3.3 | O | 3.3 | |
| 52 | - | - | - | EC2PD_I2C_ADDR0 | I | 3.3 | - | - | - | - | - | PD I2C Address set bit/m.2 to PD SBU (RVP) |
| 54 | - | - | - | EC2PD_I2C_ADDR1 | I | 3.3 | - | - | - | - | - | |
| 56 | - | - | - | LS_Tx | BI | 1.8 | DDC_SCL | I | 1.8 | I | 1.8 | LSx input to HBR/DDC for HDMI |
| 58 | - | - | - | LS_Rx | BI | 1.8 | DDC_SDA | BI | 1.8 | BI | 1.8 | |
| KEY-M (No Connect) | | | | | | | | | | | | |
| 68 | - | - | - | - | - | - | - | - | - | - | - | NC |
| 70 | - | - | - | - | - | - | RDR_I2C_SCL | I | 1.8 | - | - | EC to HDMI RDRVR I2C |
| 72 | - | - | | - | - | | RDR_I2C_SDA | BI | | - | | |
| 74 | - | - | - | - | - | - | - | - | - | - | - | I2C Interrupt from Redriver to EC |

Fig. 8B

USB Type-C port

| Pin | Description | |
|---|---|---|
| A1 | GND | power return path |
| A2 | TX1+ | differential transmit(1) |
| A3 | TX1- | differential transmit(1) |
| A4 | VBUS | power |
| A5 | CC1 | channel configuration |
| A6 | D+ | differential pair used for USB 2.0 connectivity |
| A7 | D- | differential pair used for USB 2.0 connectivity |
| A8 | SBU1 | low speed signal path, alternative mode |
| A9 | VBUS | power |
| A10 | RX2- | differential receive(2) |
| A11 | RX2+ | differential receive(2) |
| A12 | GND | power return path |
| B1 | GND | power return path |
| B2 | TX2+ | differential transmit(2) |
| B3 | TX2- | differential transmit(22) |
| B4 | VBUS | power |
| B5 | CC2 | channel configuration |
| B6 | D+ | differential pair used for USB 2.0 connectivity |
| B7 | D- | differential pair used for USB 2.0 connectivity |
| B8 | SBU2 | low speed signal path, alternative mode |
| B9 | VBUS | power |
| B10 | RX1- | differential receive(1) |
| B11 | RX1+ | differential receive(1) |
| B12 | GND | power return path |

Fig. 8C

HDMI port

| Pin | Description |
|---|---|
| 1 | TMDS Date 2+ |
| 2 | TMDS Data 2 shield |
| 3 | TMDS Data 2- |
| 4 | TMDS Data 1+ |
| 5 | TMDS Data 1 shield |
| 6 | TMDS Data 1- |
| 7 | TMDS Data 0+ |
| 8 | TMDS Data 0 shield |
| 9 | TMDS Data 0- |
| 10 | TMDS Clock+ |
| 11 | TMDS Clock shield |
| 12 | TMDS Clock- |
| 13 | CEC |
| 14 | HEC Data- |
| 15 | SCL Serial Clock for DDC |
| 16 | SDA Serial Data Line for DDC |
| 17 | DDC / CEC / HEC Ground |
| 18 | +5 V Power (50 mA max) |
| 19 | Hot Plug Detect (1.3) / HEC Data+ (1.4) |

Fig. 8D

| | |
|---|---|
| Bit [0] | 1: module 1 is connected |
| Bit [3:1] | Module Type: i.e.<br>000: Type-C module<br>001: Type-A module<br>010: HDMI module<br>011: DP module |
| Bit [4] 1: | module 2 is connected |
| Bit [7:5] | Module Type |
| Bit [8] | 1: Module 3 connected |
| Bit [11:9] | Module Type |
| Bit [12] | 1: Module 4 connected |
| Bit [15:13] | Module Type |

Fig. 10

| | |
|---|---|
| Bit [15:0] | When respective EC Type-C Module X bit[3:1] value returns as:<br>▯ 000b or 001b – Program the port to No Restriction" (0x0)<br>o 001b : PMC Type C port enabled strap should be programed to 0 as well<br>▯ 010b or 011b – Program the port to DP Fixed Connection (0x1) (i.e., DisplayPort or HDMI)<br>PMC can use the value and shift right for 1 bit when copy to IOM Type-C port strap.<br><br>Bit [0]: 0 = module1 is not used; no override<br>Bit [3:1]<br>Module Type: i.e.<br>000: Type-C module<br>001: Type-A module<br>010: HDMI module<br>011: DP module<br><br>Bit [4]: 0 = module2 is not used; no override<br>Bit [7:5]<br>Module Type<br><br>Bit [8]: 0 = module3 is not used; no override<br>Bit [11:9]<br>Module Type<br><br>Bit [12]: 0 = module4 is not used; no override<br>Bit [15:13]<br>Module Type<br>* For repurposing Type-C Lane to Type –A port (when respective EC Type-C Module value = 010b), BIOS shall report the port as "No restriction" and follow 0xA7 command requirement to propagate the Type-A port info to PMC separately.<br>** The name follows the Type-C Port-x Configuration name in FIT tool to manage the port to non-USB usage. |

Fig. 11

CPU Descriptor Record 5 (Flash Descriptor Records)
Flash Address: MDTBA + 07Ch
Default Flash Address: C7Ch

| Offset from 0 | Bits | Description | Usage | FIT visible? |
|---|---|---|---|---|
| 0xC7Ch | 31:16 | reserved, set to '0' | | |
| 0xC7Ch | 15:12 | Type-C Port 4 Configuration<br>0x0=No restrictions<br>0x1=DP fixed connection<br>0x2=Reserved<br>0xE=No Thunderbolt on this port | Determines configuration of Type-C Port 4 | Yes |
| 0xC7Ch | 11:8 | Type-C Port 3 Configuration<br>0x0=No restrictions<br>0x1=DP fixed connection<br>0x2=Reserved<br>0xE=No Thunderbolt on this port | Determines configuration of Type-C Port 3 | Yes |
| 0xC7Ch (cont.) | 7:4 | Type-C Port 2 Configuration<br>0x0=No restrictions<br>0x1=DP fixed connection<br>0x2=Reserved<br>0xE=No Thunderbolt on this port | Determines configuration of Type-C Port 2 | Yes |
| 0xC7Ch (cont.) | 3:0 | Type-C Port 1 Configuration<br>0x0=No restrictions<br>0x1=DP fixed connection<br>0x2=Reserved<br>0xE=No Thunderbolt on this port | Determines configuration of Type-C Port 1 | Yes |

Fig. 12

| | |
|---|---|
| Type-C Subsystem Port Enable Mask | 0xF (all ports are type C) |
| Type-C Port 1 Configuration | No Restrictions |
| Type-C Port 2 Configuration | No Restrictions |
| Type-C Port 3 Configuration | No Restrictions |
| Type-C Port 4 Configuration | No Restrictions |

Fig. 13

Power Delivery (PD) Controller Configuration

| | |
|---|---|
| Re-timer Power Gating Enabled | No |
| Type-C Port 1 Enabled | No |
| Type-C Port 1 Re-timer Present | No |
| Type-C Port 1 Re-timer Configuration Enabled | No |
| Type-C Port 1 SMBus Address | 0x20 |
| USB2 Port Number Associated with Type-C Port 1 | USB2 Port 1 |
| USB3 Port Number Associated with Type-C Port 1 | Type-C Port 1 |

Fig. 14

Power Delivery (PD) Controller Configuration

| | |
|---|---|
| Re-timer Power Gating Enabled | No |
| Type-C Port 1 Enabled | Yes |
| Type-C Port 1 SMBus Address | 0x20 |
| USB2 Port Number Associated with Type-C Port 1 | USB2 Port 1 |
| USB3 Port Number Associated with Type-C Port 1 | Type-C Port 1 |
| Type-C Port 2 Enabled | No |
| Type-C Port 1 SMBus Address | 0x24 |
| USB2 Port Number Associated with Type-C Port 2 | USB2 Port 2 |
| USB3 Port Number Associated with Type-C Port 2 | Type-C Port 2 |

Fig. 15

| Bits | Name | Description |
|---|---|---|
| 1 bit | Type C Port Mode | Indicates whether the USB3 port for the associated Type-C port is owned by TCSS or SoC/PCH.<br>0: TCSS owns USB3 port. USB3 SPR programming is performed by the IOM. The PMC forwards Type-C message information to the IOM via an IOSF-SB write, wand waits for a response.<br>1: The SoC/PCH owns USB3 port. USB3 SPR programming is performed by the PMC.<br>note: SoC/PCH always owns USB2 ports and, hence, PMC always performs USB2 SPR programming. |
| 1 bit | Type C Port Enabled | Indicates whether the associated Type-C port is enabled. |
| 1 bit | Re-time Present | Indicates whether the associated re-timer requires configuration. |
| 1 bit | Re-time Configuration Enabled | Indicates the configuration type of re-timer for the associated Type-C port.<br>0: Type-C port with one re-timer.<br>1: Type-C port with two re-timers. |
| 8 bits | Type-C Port SMBus Address | SMBus address for the associated Type-C port |
| 8 bits | Re-timer SMBus Address | SMBus address for the associated re-timer |
| 8 bits | Re-timer2 SMBus Address | SMBus address for the associated re-timer2 |
| 4 bits | USB2 Port Number for Type-C Port | USB2 port number for the associated Type-C port |
| 4 bits | USB3 Port Number for Type-C Port | USB3 port number for the associated Type-C port |

Fig. 16

| | | |
|---|---|---|
| | | TYPEC_CONFIGURATION_1 |
| **Bits** | **Default** | **Description** |
| 3:0 | 0x0 | **FIXED_CONNECTION_PORT1**<br>0001 : DisplayPort or HDMI, 0010 : DisplayPort input(Dpin) other : values are reserved |
| 7:4 | 0x0 | **FIXED_CONNECTION_PORT2**<br>0001 : DisplayPort or HDMI, 0010 : DisplayPort input(Dpin) other : values are reserved |
| 11:8 | 0x0 | **FIXED_CONNECTION_PORT3**<br>0001 : DisplayPort or HDMI, 0010 : DisplayPort input(Dpin) other : values are reserved |
| 15:12 | 0x0 | **FIXED_CONNECTION_PORT4**<br>0001 : DisplayPort or HDMI, 0010 : DisplayPort input(Dpin) other : values are reserved |
| 19:16 | 0x0 | **FIXED_CONNECTION_PORT5**<br>FIXED CONNECTION PORT5 |
| 23:20 | 0x0 | **FIXED_CONNECTION_PORT6**<br>FIXED CONNECTION PORT6 |
| 27:24 | 0x0 | **RSVD1**<br>Reserved |
| 31:28 | 0x0 | **RSVD2**<br>Reserved |

Fig. 17

Plunger movement
Plunger
2150
2000
Compression spring
2102
2101
Lock feature 2100
420

2105
Snap lock feature
420

2100
420

2000
2250
2101
420

2000
2260
420

2000
2270
420

ENABLING UNIVERSAL CORE MOTHERBOARD WITH FLEXIBLE INPUT-OUTPUT PORTS

FIELD

The present application generally relates to the field of computing devices with input-output (IO) ports.

BACKGROUND

Computing devices such as laptops and desktop computers typically have one or more input-output (IO) ports which allow the computing device to connect to external components to send and receive data, or provide or receive power. Examples of such external components include monitors, keyboards, mouse/pointing devices, portable storage devices, hubs, Bluetooth adapters, Direct Current (DC) chargers (power adapters) and batteries. Typically, a user plugs in a cable to a port to connect the external component. Various types of ports include Universal Serial Bus (USB), Thunderbolt (TBT), DisplayPort (DP) and High-Definition Multimedia Interface (HDMI). However, even for a particular model of a computing device of a manufacturer, different types of ports are often provided based on factors such as the intended use, the price point and customer preferences. However, various challenges are presented in accommodating the various types of ports.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 8A depicts an example connector pinout, listing signals which are communicated between the host platform and the modules of FIG. 7, in accordance with various embodiments.

FIG. 8B depicts a continuation of the example connector pinout of FIG. 8A, in accordance with various embodiments.

FIG. 8C depicts an example configuration of pins on a USB-C port.

FIG. 8D depicts an example configuration of pins on an HDMI port.

FIG. 10 depicts an example data structure used to detect a module type, in accordance with various embodiments.

FIG. 11 depicts an example format of a port configuration override, in accordance with various embodiments.

FIG. 12 depicts an example CPU descriptor record, in accordance with various embodiments.

FIG. 13 depicts an example of a FIT tool which exposes all ports as Type-C, in accordance with various embodiments.

FIG. 14 depicts an example of an interface of a FIT tool which populates a Power Delivery (PD) Controller Configuration for all the ports, where all the ports, including the Type-C port 1, are not disabled, in accordance with various embodiments.

FIG. 15 depicts an example of an interface of a FIT tool which populates a Power Delivery (PD) Controller Configuration for all the ports, where the Type-C port 1 is enabled and the Type-C port 2 is disabled, in accordance with various embodiments.

FIG. 16 depicts an example of an interface of a FIT tool indicating a USB-C Per Port Soft Strap in accordance with various embodiments.

FIG. 17 depicts an example TYPEC_CONFIGURATION_1 data structure, in accordance with various embodiments.

DETAILED DESCRIPTION

Figure 1:
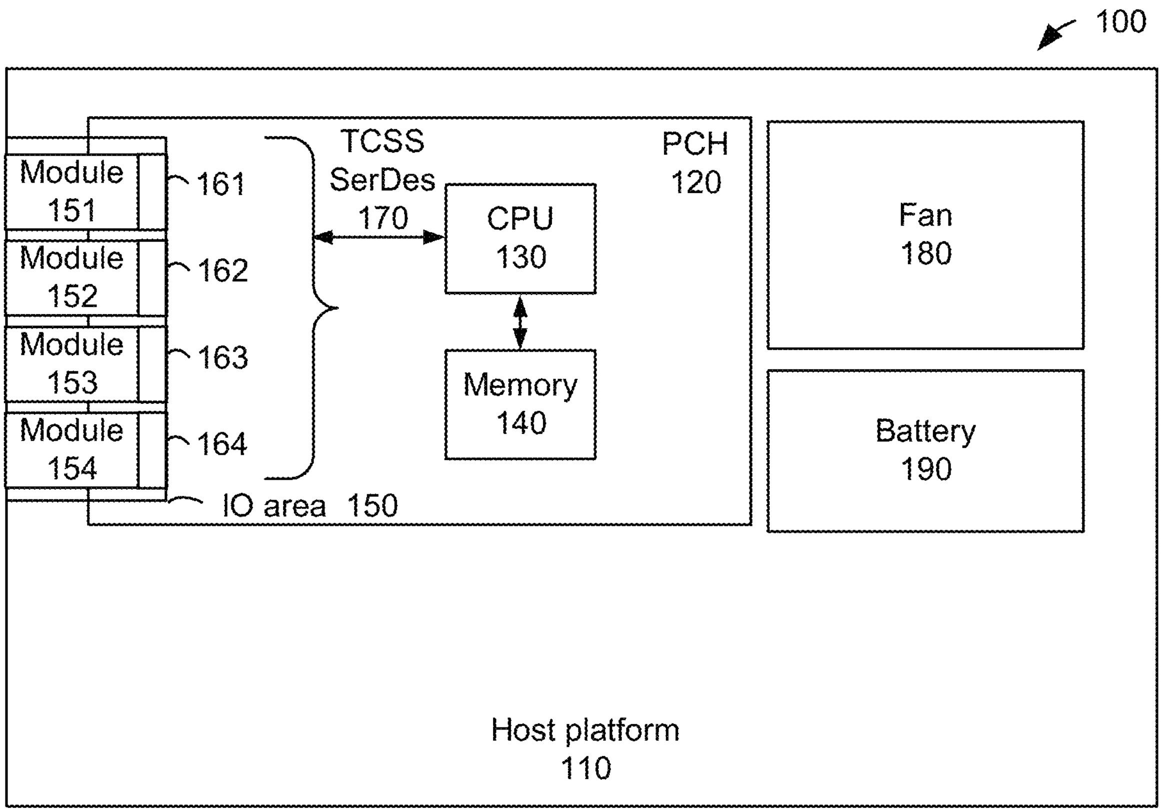
FIG. 1 depicts an example computing system having four modules for connecting to external components, in accordance with various embodiments.

As mentioned at the outset, various challenges are presented in accommodating various types of IO ports in a laptop, desktop or other computing device, also referred to as a client platform. For example, the internal components typically have to be customized according to the types of ports. This results in increased complexity and expense for the manufacturer.

A first issue is that a client platform System-on-Chip (SoC) supports a wide range of TDP (thermal design power), e.g., 15-45 W, enabling various consumer segments that require varied feature sets and system sizes. For example, the OEM/ODM (Original Equipment Manufacturer/Original Design Manufacturer) of a laptop typically must design multiple PCB (printed circuit boards) for the same SoC (System on a Chip) package according to multiple different IO (input/output) port requirements based on factors such as the target market segment. Example of such IO ports include USB 3.0, TBT, DP, HDMI, DC barrel plug or Type-C charging port (EPR/SPR). Currently, the OEM/ODM designs separate motherboards or daughterboards for different system feature requirements which need separate efforts in terms of electrical, mechanical and development concerns. This can directly impact the overall design cost of the system and the time to market.

One potential solution involves a hub/dongle which connects by cable to the IO port of interest, e.g., a USB-C-HDMI dongle. However, this result in additional cost for the customer and clutter near the computing device. This approach also requires a dedicated USB-C Port controller, PD (Power Delivery) circuits and additional protocol convertors/repeaters on the host system to meet the electrical specification at the IO connector (e.g., DP/HDMI). This increases the cost of the computing device and can impact performance and power efficiency.

A second issue is a desire for the consolidation of AC (alternating current) adapter type (e.g., barrel, flat, USB Type-C, etc.) and data port. USB Type-C is one choice for delivery of both power and data as it accommodates multiple protocol such as USB, TBT, DP and HDMI. There are some use cases which utilize both power delivery (e.g., provider/power source) data path simultaneously. One example is an external USB-C SSD (solid state drive) which transfers data to/from the computing device as well as receiving power from the computing device. However, there are many other use cases which do not need both power and data concurrently at all times. For example, when the USB-C port is utilized only for power delivery (e.g., as a consumer/power sink), the user cannot use the data path and, similarly, when the USB-C port is utilized only for data (e.g., for a DisplayPort), the user cannot use the power path. Most of the time, based on the use case, either the power delivery path resources or the data path resources are redundant, resulting in a less than optimal utilization of the available system features.

One potential solution involves increasing the number of USB-C ports. This involves a SoC integrated solution, which increases the cost of the SoC, or a discrete solution, which increases the cost of the platform components. Both solutions significantly impact the overall system form factor, cost, power consumption and thermal solution. For example, each USB Type-C Port requires an approximately 2 mm square silicon area, a count of 25-30 balls in a ball grid array and additional packaging efforts.

Another potential solution involves a docking station which extends the capabilities of a laptop with additional ports, different type of ports and other features. However, this is generally an expensive laptop accessary, and is mainly targeted for non-portable setups.

The techniques herein address the above and other issues.

In one aspect, a module is provided which can be easily and quickly inserted into or removed from a computing device by the user. That is, the module is removable by the user. The module includes a port which is configured for a desired specification, such as USB-A, USB-C, TBT, DP or HDMI. The module can comprise an expansion card such as an M.2 card. M.2 is a specification for internally mounted computer expansion cards and associated connectors. The module further includes circuitry for communicating with a host platform such as a SoC or motherboard, for example.

The host platform can communicate with different types of modules in a standardized way so that complexity and costs are reduced. Additionally, the user has the flexibility to quickly and easily change out the types of modules.

In another aspect, the modules are fixed within the computing device and not intended to be changed out.

In another aspect, with a dual port module, the host platform can concurrently send/receive power through one port and send/receive data from the other port.

These and other features will be apparent in view of the following discussion.

The following acronyms and terms are used:

IO: input-output

DC: Direct Current

USB: Universal Serial Bus

USB-C EPR (Extended Power Range): a standard which allows USB-C to support power delivery up to 240 W, e.g., up to 48 V at 5 A.

USB-C SPR (standard power range): a standard which allows USB-C to support power delivery up to 100 W, e.g., up to 20 V at 5 A.

TBT: Thunderbolt. A brand name of a hardware interface for the connection of external peripherals to a computer. It combines Peripheral Component Interconnect Express (PCIe) and DisplayPort (DP) into two serial signals, and provides DC power, all in one cable. Up to six peripherals may be supported by one connector. Thunderbolt 1 and 2 use the same connector as Mini DisplayPort (MDP), and Thunderbolt 3 and 4 reuse the USB-C connector from USB. Thunderbolt 3 and 4 can transfer data at high speeds than USB-C. For example, Thunderbolt 3 and 4 can transfer data at up to 40 Gbps which is twice as fast as the 20 Gbps maximum throughput speed of the fastest USB-C ports.

DP: DisplayPort. A digital display interface used to connect a video source to a display device such as a computer monitor. It can also carry audio, USB, and other forms of data.

HDMI: High-Definition Multimedia Interface. A proprietary audio/video interface for transmitting uncompressed video data and compressed or uncompressed digital audio data from an HDMI-compliant source device, such as a display controller, to a compatible computer monitor, video projector, digital television, or digital audio device. HDMI is a digital replacement for analog video standards.

PCIe: Peripheral Component Interconnect Express. A high-speed serial computer expansion bus standard. It is the common motherboard interface for personal computers' graphics cards, hard disk drive host adapters, Solid-state drives (SSDs), Wi-Fi and Ethernet hardware connections.

MDP: Mini DisplayPort (MDP). A miniaturized version of the DisplayPort audio-visual digital interface.

OEM/ODM (Original Equipment Manufacturing/Original Design Manufacturing)

TDP: Thermal Design Power.

PCB: Printed Circuit Board.

GPIO: General-purpose input-output. An uncommitted digital signal pin on an integrated circuit or electronic circuit board which may be used as an input or output, or both, and is controllable by software.

SoC: System on a Chip. An integrated circuit that integrates all or most components of a computer or other electronic system. These components can include, e.g., a central processing unit (CPU), a graphics processing unit (GPU), memory interfaces, on-chip input/output devices, input/output interfaces, and secondary storage interfaces.

VBUS: Virtual Bus. A power path between a host and a device which carries a nominal 5 V supply.

TCP: USB Type-C Port.

PPS: Programmable Power Supply. A standard that refers to an advanced charging technology for USB-C devices. It can modify in real time the voltage and current by feeding maximum power based on a device's charging status.

Motherboard: The main printed circuit board (PCB) in general-purpose computers and other expandable systems. It holds and allows communication between many of the important electronic components of a system, such as the central processing unit (CPU) and memory, and provides connectors for other peripherals. Unlike a backplane, a motherboard usually contains significant sub-systems, such as the central processor, the chipset's input/output and memory controllers, interface connectors, and other components integrated for general use.

The PCB has expansion capabilities such that components which can be attached to a motherboard include peripherals, interface cards, and daughterboards: sound cards, video cards, network cards, host bus adapters, TV tuner cards, IEEE 1394 cards; and a variety of other custom components.

Daughterboard: An expansion card that attaches to a system directly. Daughterboards often have plugs, sockets, pins or other attachments for other boards. Daughterboards often have only internal connections within a computer or other electronic devices, and usually access the motherboard directly rather than through a computer bus. Such boards can be used to improve various memory capacities of a computer, enable the computer to connect to certain kinds of networks that it previous could not connect to, or to allow for users to customize their computers for various purposes such as gaming.

TCSS SerDes: Type-C Subsystem Serializer/Deserializer. A SerDes is an integrated circuit (IC or chip) transceiver that converts parallel data to serial data and serial data to parallel data. The SerDes has a transmitter section which is a serial-to-parallel converter, and a receiver section which is a parallel-to-serial converter.

PCH: Platform Controller Hub.

SMBus: System Management Bus is a two-wire interface through which various system component chips can communicate with each other and with the rest of the system. It is based on the principles of operation of I2C.

I2C: Inter-Integrated Circuit. A synchronous, multi-controller/multi-target, packet switched, single-ended, serial communication bus used for attaching lower-speed peripheral ICs to processors and microcontrollers for short-distance, intra-board communication.

EEPROM: Electrically Erasable Programmable Read-Only Memory.

MFD: Multi-function Display. This can be a small-screen surrounded by multiple soft keys that can be used to display information to the user in various configurable ways.

FIG. 1 depicts an example computing system having four modules for connecting to external components, in accordance with various embodiments. The computing system 100 includes a host platform 110 on which a number of components are attached. For example, the system includes a PCH 120 or other chipset. In a computer system, a chipset is, e.g., a set of electronic components in one or more integrated circuits that manages the data flow between the processor, memory and peripherals. It is usually found on the motherboard. Chipsets are usually designed to work with a specific family of microprocessors. PCH is a family of microchips of Intel Corporation.

The PCH includes a CPU 130, memory 140, and an IO area 150 which includes four modules 151-154 with associated connectors 161-164, respectively, for communicating with the CPU via a TCSS SerDes path 170. The host platform further includes a fan 180 and a battery 190. Although four modules are depicted, this is an example only, as one or more modules can be provided. Each module can include one or more IO ports. The ports can be of various types including USB, TBT, DP and HDMI. Each port can be a different type, or multiple ports can be of the same type. For example, multiple USB-C ports can be provided due to the widespread use of these ports.

The memory 140 can store instructions which are to be executed by the CPU 130 or other processor to perform the functions described herein.

The computing system consolidates multiple IO protocols in the client silicon over a Type-C Subsystem (TCSS) Serializer/Deserializer instead of designing separate motherboards for different system IO port requirements. The motherboard can be standardized, thereby reducing development costs including design, validation and debugging. The TBT/USB4 lanes from the SoC can be used to provide a data link for the different IO port requirements, such as TBT, USB-C, USB-A, DP and HDMI. The IO ports in a laptop, for example, can be incorporated into separate modules which can be provided in a standard form factor or an OEM-specific form factor. With different modules, also referred to herein as personality modules, the system personality/feature set can be varied according to the desired requirements. The OEM/customer has the freedom to buy any personality module based on the IO port requirements and to install the module in a plug and play manner. The user can pay for modules when needed. The modules can further be used across multiple generations of the computing device.

Figure 2:
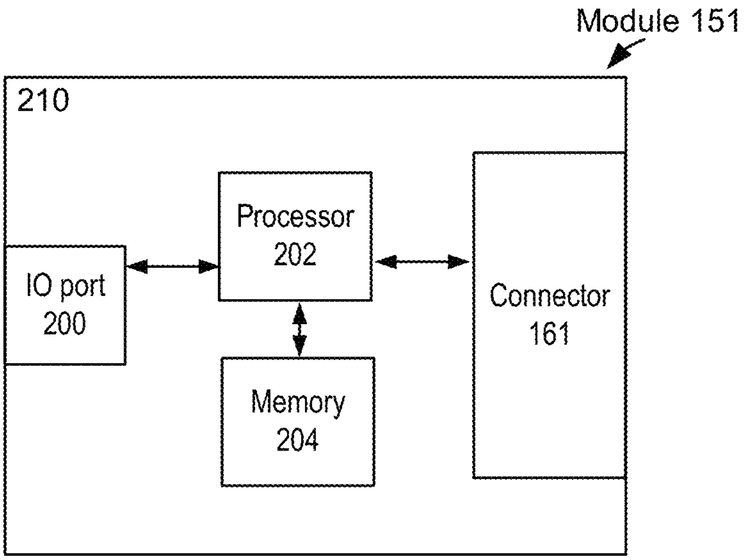
FIG. 2 depicts components of the module 151 of FIG. 1, in accordance with various embodiments.

FIG. 2 depicts components of the module 151 of FIG. 1, in accordance with various embodiments. This module is an example as the others may have a similar configuration. The module includes an IO port 200, a processor 202 and a memory 204 mounted to an expansion card 210, and the connector 161 which is an integral part of the expansion card. The connector includes pins including an example pin 300.

Figure 3:
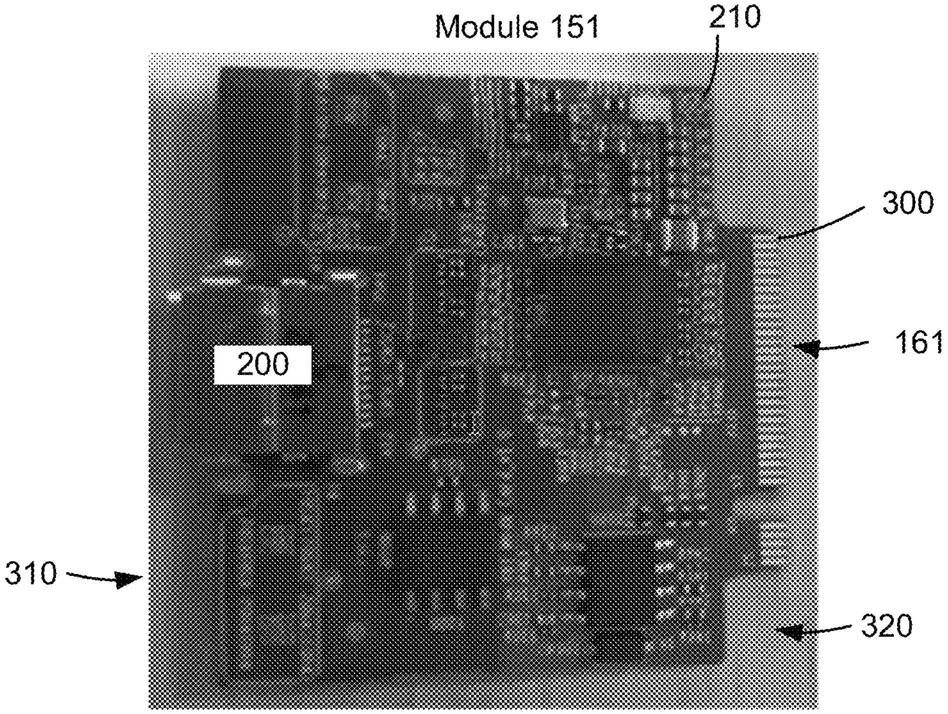
FIG. 3 depicts a photograph of a module for use in the computing system of FIG. 1, where the module comprises an expansion card, in accordance with various embodiments.

FIG. 3 depicts a photograph of a module for use in the computing system of FIG. 1, where the module comprises an expansion card 210, in accordance with various embodiments. M.2 is one example of a small form factor expansion card which is compatible with the PCH. Other types of cards could be used as well. An expansion card can comprise a PCB. M.2 is a specification for internally mounted computer expansion cards and associated connectors. M.2 modules are rectangular, with an edge connector on one side and a semicircular mounting hole at the center of the opposite edge. The edge connector has 75 positions with up to 67 pins, employing a 0.5 mm pitch and offsetting the pins on opposing sides of the PCB from each other. Each pin on the connector is rated for up to 50 V and 0.5 A. An M.2 module is installed into a mating connector provided by the host's circuit board, and a single mounting screw secures the module into place. Components may be mounted on either side of the module. Buses exposed through the M.2 connector include PCI Express 3.0 and newer, Serial ATA (SATA) 3.0 and USB 3.0. The M.2 specification provides up to four PCI Express lanes and one logical SATA 3.0 (6 Gbit/s) port).

The IO port 200 is secured to one edge 310 of the expansion card and the connector 161 is provided on an opposing edge 320. The M.2 expansion card has a key ID=M, in this example. There is one notch which results in a pin count of 59-66 pins. The provided interfaces are PCIe×4, SATA and SMBus.

In one approach, each expansion card is of the same type, even if the ports are of different types, so that the circuitry on the cards can communicate with the host platform in a standardized way.

Figure 4:
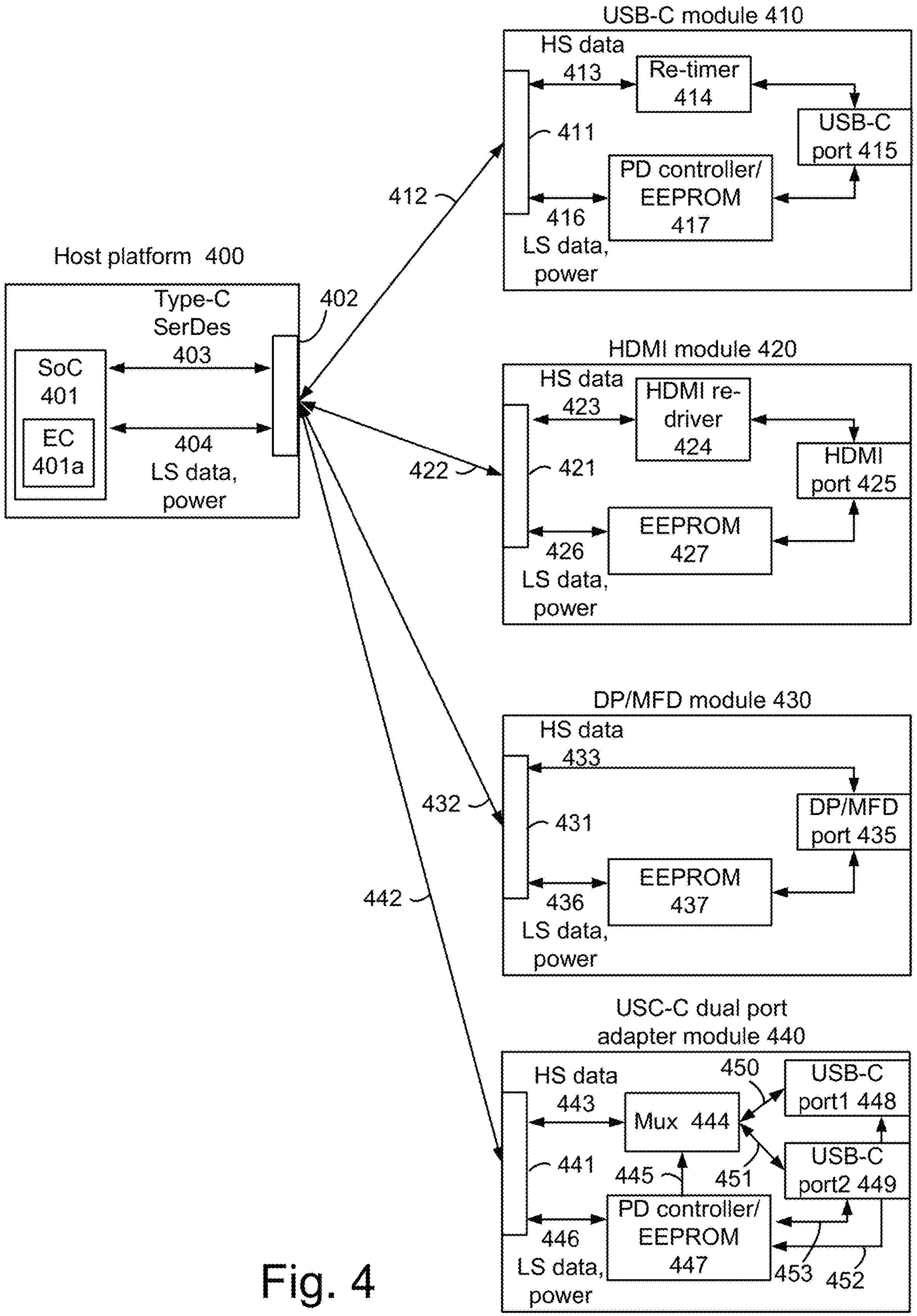
FIG. 4 depicts a configuration of the computing system of FIG. 1 in which a host platform can communicate with four modules, including a USB-C module 410, an HDMI module 420, a DP/MFD module 430 and a USB-C dual port adapter module 440, in accordance with various embodiments.

FIG. 4 depicts a configuration of the computing system of FIG. 1 in which a host platform can communicate with four modules, including a USB-C module 410, an HDMI module 420, a DP/MFD module 430 and a USB-C dual port adapter module 440, in accordance with various embodiments. These modules may correspond to the modules 151-154 of FIG. 1, for example. The modules are coupled to a host platform 400 which in this example includes a SoC 401, a connector 402, a Type-C SerDes path 403 between the SoC and the connector 402, and a low speed (LS) data path or power path 404 between the SoC and connector 402. The modules may mount to respective slots in a motherboard of the host platform, in one possible approach. The components carried on each expansion card, such as re-drivers, re-timers and EEPROM can be considered to be circuitry.

The USB-C Module 410 is coupled to the host platform via its connector 411 and paths 412. The module 410 can send high speed (HS) data to, or receive HS data from, the host platform via a path 413 which is coupled to a re-timer 414. The HS data can be 40 Gbps per lane for USB-C, for example. The LS data is at a speed lower than HS. A re-timer is a mixed signal analog/digital device that is usually implemented as an integrated circuit (IC) chip. It is protocol-aware and has the ability to fully recover data from a received signal, extract the embedded clock and retransmit a fresh copy of the data using a clean clock. The re-timer eliminates jitter, noise and other imperfections from the signal to provide a more reliable, less error prone transmission. A re-timer includes equalization functions and a clock data recovery (CDR) function to compensate both deterministic and random jitter, and in turn transmit a clean signal downstream. This is particularly important for high speed data transmissions. The re-timer can send HS data to, or receive HS data from, the USB-C port 415.

The module 410 can send low speed (LS) data to, or receive LS data from, the host platform via a path 416 which is coupled to a Power Delivery (PD) controller/EEPROM 417. The PD controller/EEPROM in turn can send LS data to, or receive LS data from, the USB-C port 415. Alternatively, the module 410 can send power from the USB-C port to the host platform via the PD controller/EEPROM 417, path 416, connector 411 and paths 412, or provide power to an external component which is plugged into the USB-C port by receiving power from the host platform via the paths 412, connector 411, path 416 and PD controller/EEPROM 417.

The HDMI module 420 is coupled to the host platform via its connector 421 and paths 422. The module 420 can send HS data to, or receive HS data from, the host platform via a path 423 which is coupled to an HDMI re-driver 424. A re-driver performs signal conditioning through equalization, providing compensation for input channel loss from deterministic jitter such as inter-symbol interference. A re-driver tends to be more suited for video applications and has a lower cost and power consumption than a re-timer. The re-driver can send HS data to, or receive HS data from, the HDMI port 425.

The module 420 can send LS data to, or receive LS data from, the host platform via a path 426 which is coupled to an EEPROM 427. The EEPROM in turn can send LS data to, or receive LS data from, the HDMI port 425. Alternatively, the module 420 can send power from the HDMI port to the host platform via the EEPROM 427, path 426, connector 421 and paths 422, or provide power to an external component which is plugged into the HDMI port by receiving power from the host platform via the paths 422, connector 421, path 426 and EEPROM 427.

The DP/MFD module 430 is coupled to the host platform via its connector 431 and paths 432. The module 430 can send HS data to, or receive HS data from, the host platform via a path 433 which is coupled to the DP/MFD port 435.

The module 430 can send LS data to, or receive LS data from, the host platform via a path 436 which is coupled to an EEPROM 437. The EEPROM in turn can send LS data to, or receive LS data from, the DP/MFD port 435. Alternatively, the module 430 can send power from the DP/MFD port to the host platform via the EEPROM 437, path 436, connector 431 and paths 432, or provide power to an external component which is plugged into the DP/MFD port by receiving power from the host platform via the paths 432, connector 431, path 436 and EEPROM 437.

The USB-C dual port adapter module 440 includes a first USB-C port 448 and a second USB-C port 449.

The module 440 is coupled to the host platform via its connector 441 and paths 442. The module 440 can send HS data to, or receive HS data from, the host platform via a path 443 which is coupled to one of the USB-C ports 448 or 449 via paths 450 and 451, respectively, and a multiplexer 444, which is controlled by a PD controller/EEPROM 447 via a path 445.

The module 440 can send LS data to, or receive LS data from, the host platform via an I2C path 446 which is coupled to the PD controller/EEPROM 447. The PD controller/EEPROM in turn can send LS data to, or receive LS data from, one of the USB-C ports 448 or 449 via paths 452 or 453, respectively. Alternatively, the module 440 can send power from one of the USB-C ports 448 or 449 to the host platform via one of the paths 452 or 453, respectively, the PD controller/EEPROM 447, path 446, connector 441 and paths 442. Or, the module 440 can power to an external component which is plugged into one of the USB-C ports 448 or 449 by receiving power from the host platform via the paths 442, connector 441, path 446, PD controller/EEPROM 447 and one of the paths 452 or 453, respectively.

In the case of module 440, the computing system overcomes a redundancy which occurs when a port used for power delivery is treated independently from a port used for data delivery. This multiplexer-based solution can be controlled by an existing system PD controller. At the time a new external device, such as a power adapter or a DP monitor, is connected to a USB port, the PD controller communicates with the port to identify the type of the device. The PD controller can concurrently enable both a power path for a first port and a data path for a second port. This reduces the size of the silicon logic. The SoC package size is also reduced by 25-30 pins per USB-C Port. The financial cost is also reduced.

In one approach, the TCSS (e.g., TBT/USB4) lanes coming from the SoC can support TBT, USB-4, USB-3, DP and other interfaces. The TCSS SerDes can be configured to support other interface protocols such as HDMI through soft strap changes, e.g., the default configuration set during boot. This provides the opportunity to modularize the IO connectors and support the personality modules inside the chassis as a pluggable form factor module to the laptop IO area 150 (FIG. 1). The module pinout can be standard so that with the same form factor, any IO port connector personality module can be plugged into the computing device.

Based on the system requirements, the personality module can be assembled in the laptop chassis by the OEM or the user. In one approach, an embedded controller (EC) 401*a* such as in the SoC detects the personality module based on a GPIO interrupt and initiates an Inter-Integrated Circuit (I2C) communication with the EEPROM inside the module, where the EEPROM contains module configuration data such as supported IO device type and power profiles. This configuration data can be used to detect the type of personality module in the system and configure the TCSS SerDes and low speed interfaces (e.g., LSx/Aux/I2C) accordingly.

The SoC and/or embedded controller can be considered to be one or more processors.

In the modules, the connector pinout, or assignment of functions/signals to pins, can be standardized to support the superset features such as TBT, system charging (e.g., EPR and PPS) and module power. Based on the personality module plugged in, the system features can be varied and the setting of system SKUs could be done by the OEMs (e.g., USB-C, TBT, HDMI, DP etc.). A Stock Keeping Unit (SKU) refers to a unique identifier for a particular stock of goods. The personality module could be detachable by the user or could be enclosed inside the chassis by the manufacturer.

The personality module can have only the necessary components for its specific IO requirement (e.g., PD controller, re-timers, connectors, etc.). This will eliminate the same components on the system motherboard and thus optimize the overall solution cost for a given IO port. For example, for an HDMI module, a PD controller is not required for the operations performed.

Moreover, redundant resources can be avoided with the module 440. With the existing PD controller and additional multiplexer on the data path, the user can utilize the available TCP-1 resources fully. As in FIG. 5, where the SoC need only one user one TCSS SerDes for connecting both a Type-C charger and a Type-C monitor at the same time. The PD controller can detect the type of device connected on the first port and, based on that, the power or data resource can be connected to the second port. This provides a number of benefits. First, two different devices (e.g., a power adapter and a monitor) can use one TCP-1 port resource simultaneously to achieve the same functionality of using two TCP ports. Second, compared to an implementation using two TCP ports, system complicity is reduced. For example, an additional SoC port can be removed, platform area is reduced and a corresponding software/firmware/system solution is provided. Third, this approach fits in with the common configuration of a power adapter and a monitor for users of laptops or other computing devices. Less common is a configuration such as using two USB-C solid state drives (SSD). Finally, with SoC TCP ports, a comfortable and simple working setup can be achieved with any docking station.

Figure 5:
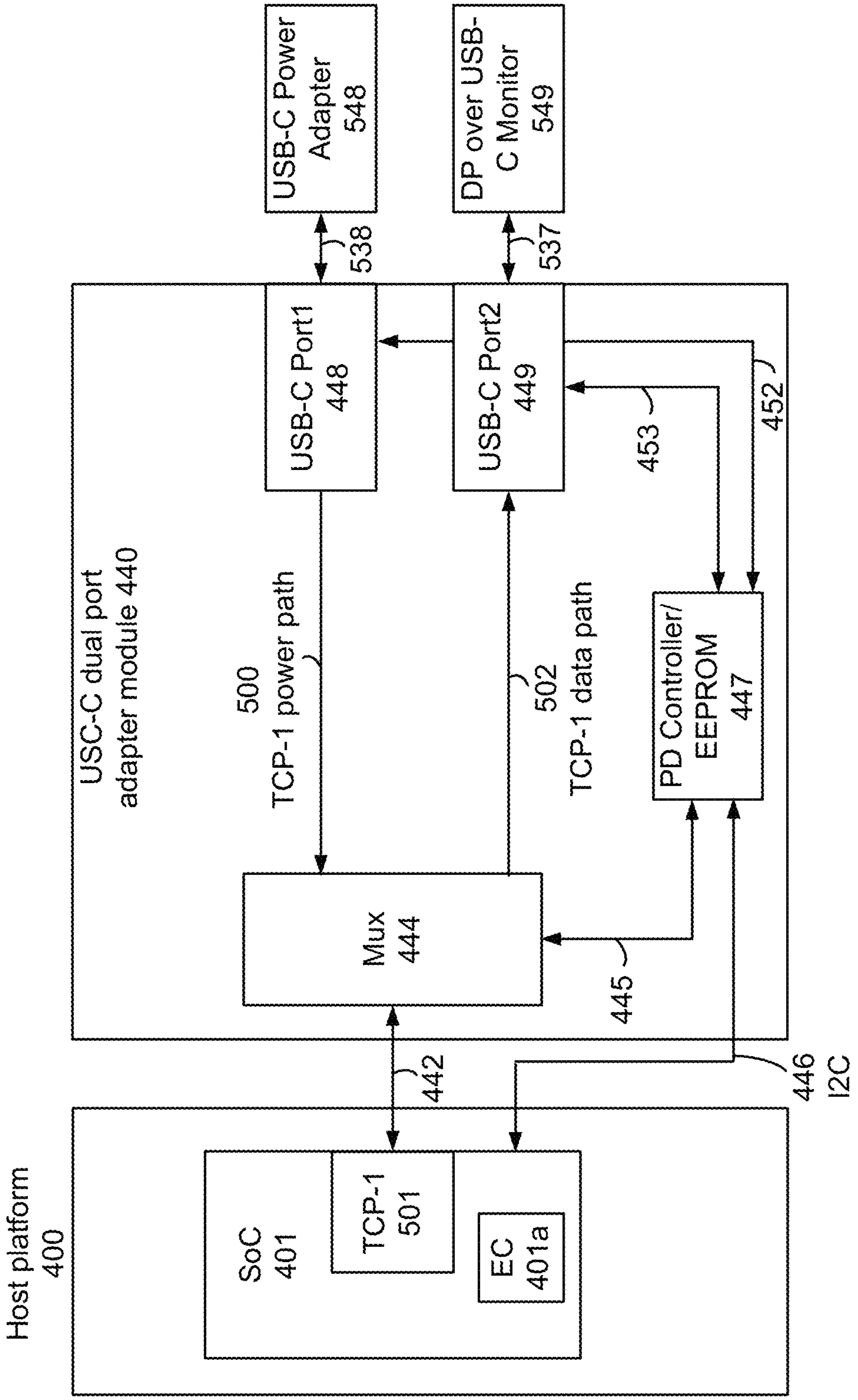
FIG. 5 depicts a computing system in which a single Type-C port (TCP-1) 501 of a SoC 401 can receive power via a first USB-C port 448 and transmit data via a second USB-C port 449, consistent with the module 440 and host platform 400 of FIG. 4, and in accordance with various embodiments.

FIG. 5 depicts a computing system in which a single Type-C port (TCP-1) 501 of a SoC 401 can receive power via a first USB-C port 448 and transmit data via a second USB-C port 449, consistent with the module 440 and host platform 400 of FIG. 4, and in accordance with various embodiments. The port 501 is I/O from the TCSS subsystem of the SoC and is capable of multi-rate protocols such as USB4, TBT, DP and HDMI. The first and second USB ports are part of a dual port adapter module. A multiplexer 444 concurrently couples one or more of the paths of the first USB port 448, e.g., one or more paths which carry power, to the Type-C port (TCP-1) of the SoC, and one or more paths of the second USB port 449, e.g., one or more paths which carry data, to TCP-1. In this example, a USB-C power adapter 548 is coupled to the first USB port 448 by a cable 538 to provide DC power to the SoC via a path 500, the multiplexer 444 and a path 442. The power can be coupled to a battery charger and a battery. Additionally, a DP over USB-C monitor 549 is coupled to the second USB port by a cable 537 to receive display data via a path 502, the multiplexer 444 and the path 442. DisplayPort over USB Type-C enables the delivery of DisplayPort audio/video signals. It may also be referred to as DP alt mode.

The multiplexer can be coupled to the pins of the modules using pinouts such as in FIG. 8A to 8C. The PD controller/EEPROM is coupled to the multiplexer 444 via a path 445 to control the multiplexer in terms of which paths from the USB-C ports 448 and 449 are coupled to the SoC. The PD controller/EEPROM is also coupled to the SoC via a path 446 and to the USB-C ports 448 and 449 via paths 452 and 453, respectively.

Figure 6A:
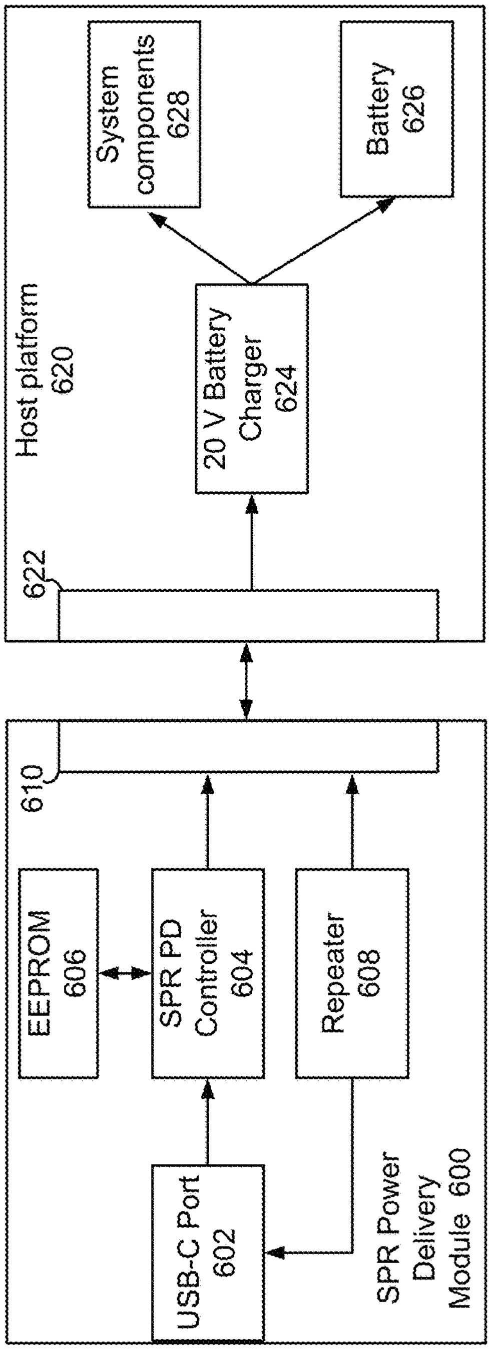
FIG. 6A depicts a SPR power delivery module providing power to a host platform, in accordance with various embodiments.

FIG. 6A depicts a SPR power delivery module providing power to a host platform, in accordance with various embodiments. The USB-C personality module can support both data and power paths, as a provider/consumer in either case. The module may have a port controller integrated with an EEPROM for data and power negotiations. Based on the module, the port controller firmware supports IO standards such as USB, DP, USB4, TBT and MFD. Also, based on system design and module used, SPR or EPR power profiles can be supported. The EEPROM configuration can store information on the module EPR/SPR capability status and the host will inform its EPR/SPR capability through a side band signal. For example, the module can have a hardware strap pin which will terminate on the host to tell the module PD controller about the host capability. Accordingly, the negotiation of SPR or EPR voltage will be done by the PD controller to the charger. System software will ensure the module output power voltage matches with the system input voltage capability. In the case of a module just supporting EPR voltage (20 V to 48 V) and system SPR range (0-20 V), the port sink power path will not be enabled.

In the example configuration, the SPR power delivery module 600 includes a USB-C port 602 which provides data to a SPR PD controller 604, which is in communication with an EEPROM 606 and a connector 610. The USB-C port is also coupled to a repeater 608. The connector 610 provides the power to a host platform 620 via its connector 622. The power is received at a 20 V battery charger 624, for example, which can charge a battery 626 and provide power to other system components 628.

Figure 6B:
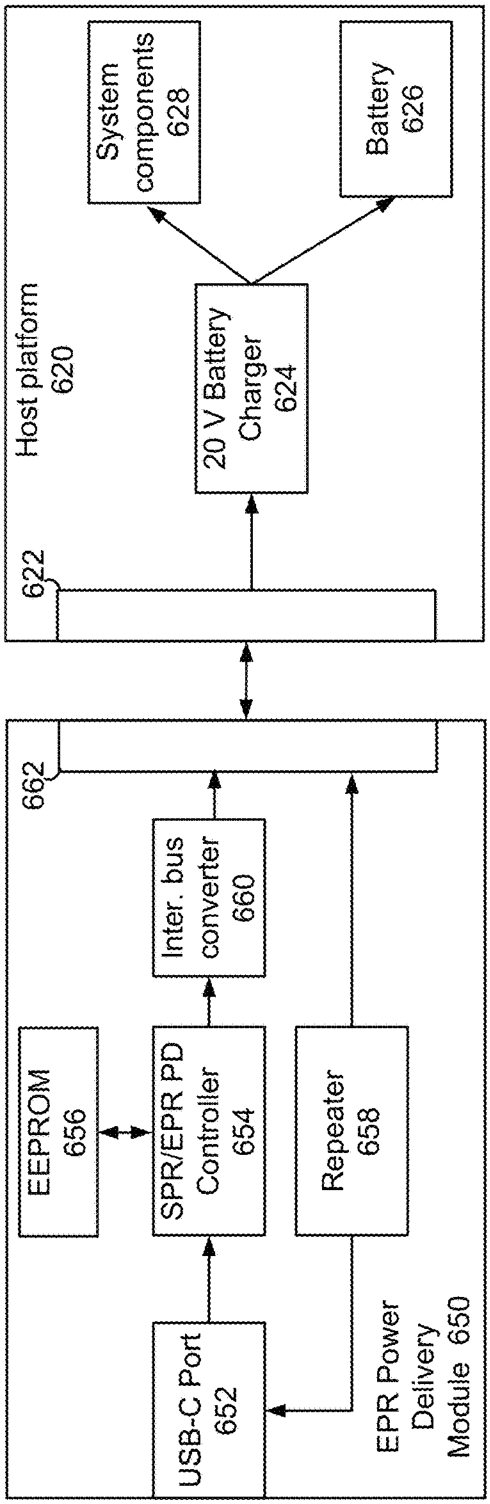
FIG. 6B depicts an EPR power delivery module providing power to a host platform, in accordance with various embodiments.

FIG. 6B depicts an EPR power delivery module providing power to a host platform, in accordance with various embodiments. The EPR power delivery module 650 includes a USB-C port 652 which provides data to a SPR/EPR PD controller 654, which is in communication with an EEPROM 656 and an inter. bus converter. An inter bus converter is buck boost power regulator. It will convert EPR voltage to SPR voltage before giving it to a battery charger, which can only take a maximum SPR voltage of 24 V, for example. USB-C port is also coupled to a repeater 658. The inter. bus converter 660 in turn is coupled to a connector 662 to provide power to the host platform 620 via its connector 622, as discussed in connection with FIG. 6A.

Figure 7:
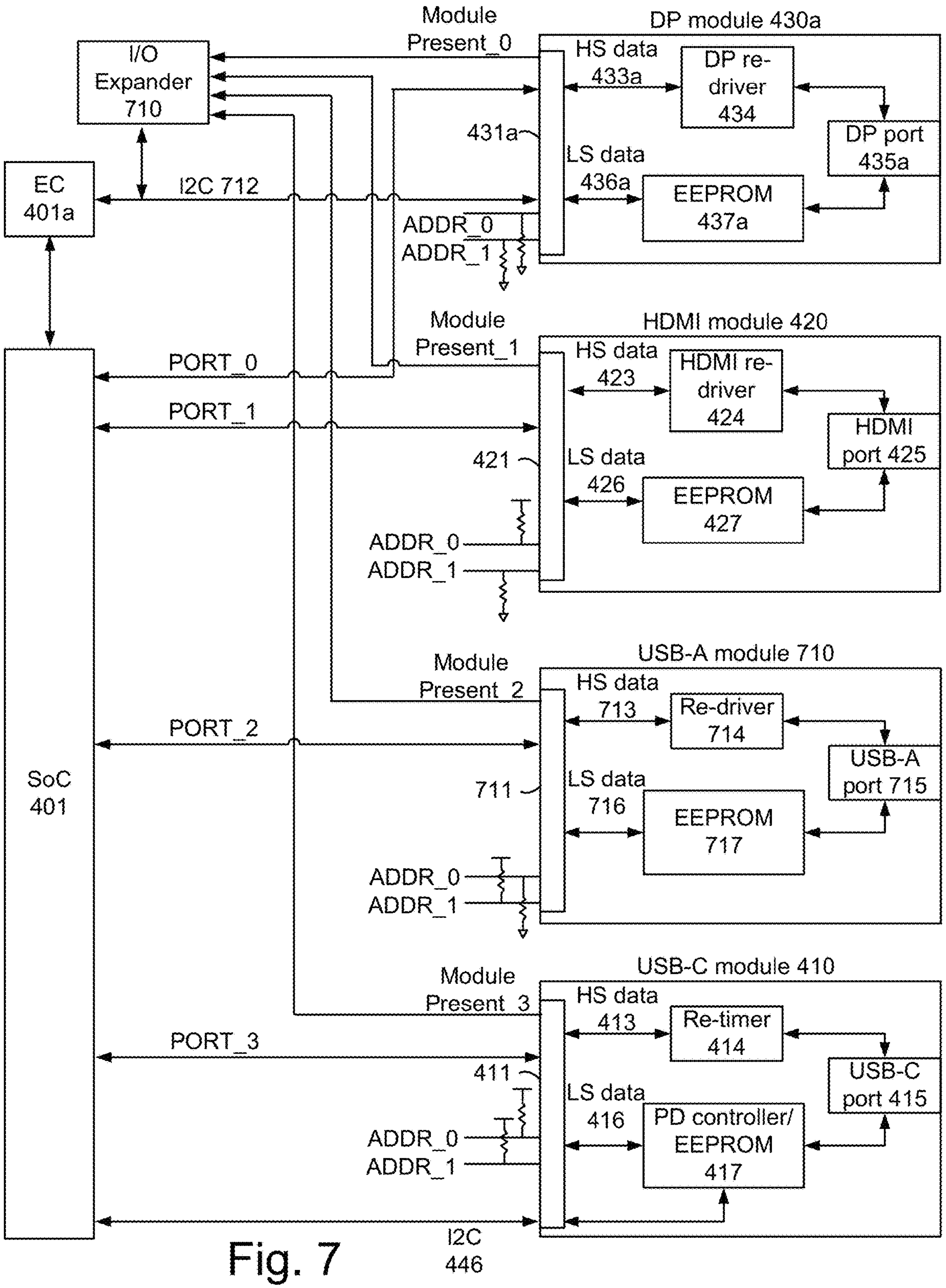
FIG. 7 depicts an example computing system in which a host platform can communicate with four modules, including a DP module 430*a*, an HDMI 2.1 module 420, a USB-A module 710 and a USB-C module 410, in accordance with various embodiments.

FIG. 7 depicts an example computing system in which a host platform can communicate with four modules, including a DP module 430*a*, an HDMI 2.1 module 420, a USB-A module 710 and a USB-C module 410, in accordance with various embodiments. A software ecosystem can be provided to support the modular concept. Each module can have a dedicated "module present" signal which indicates to the host that it is connected. Each module can also have a preset unique address which is set by the host. The EC can use this unique address to communicate with individual EEPROMs in the modules. This example represents module detection to the host platform, e.g., SoC, and I2C addressing.

This example includes a DP module 430*a* which is similar to the DP module 430 of FIG. 4 but includes a DP re-driver 434. The protocol and speed is different for USB Type-C, DP, USB Type A and HDMI. Accordingly, when the interface is configured with a respective protocol, a respective protocol re-driver or re-timer will be used. The HS data path 433*a*, LS data path 436*a*, connector 431*a*, EEPROM 437*a* and DP port 435*a* correspond to the HS data path 433, LS data path 436, connector 431, EEPROM 437 and DP/MFD port 435, respectively, of FIG. 4. The HDMI module 420 is the same as in FIG. 4. The USB-C module 410 is the same as in FIG. 4. The USB-A module 710 is similar to the USB-C module 410 but includes a re-driver 714 instead of a re-timer 414. The USB-A module further includes a HS data path 713, LS data path 716, connector 711, EEPROM 717 and USB-A port 715. The SoC 401 and EC 401*a* of FIG. 4 are also depicted. In this example, these components are separate but in communication.

As mentioned, each module can generate a module present signal. This is depicted by Module Present_1, Module Present_2, Module Present_3 and Module Present_4 for modules 430*a*, 420, 710 and 410, respectively. The module present signals are received at an I/O expander 710, which in turn communicates with the EC 401*a* via an I2C bus 712. A port communication path PORT_0, PORT_1, PORT_2 and PORT_3 is provided to allow communication between the SoC and the modules 430*a*, 420, 710 and 410, respectively. A two-bit address is further provide for each module, including bits ADDR_0 and ADDR_1 which are pulled high (1) or low (0). For example, ADDR_0=high and ADDR_1=low, ADDR_0=low and ADDR_1=high, ADDR_0=low and ADDR_1=low, and ADDR_0=high and ADDR_1=high, identify modules 430*a*, 420, 710 and 410, respectively.

The module 410 can communicate with the SoC via the I2C path 446 as in FIG. 4.

FIG. 8A depicts an example connector pinout, listing signals which are communicated between the host platform and the modules of FIG. 7, in accordance with various embodiments. FIG. 8B depicts a continuation of the example connector pinout of FIG. 8A, in accordance with various embodiments.

FIG. 8A depicts the pins on a first side (side A) of the module and FIG. 8B depicts the pins on the opposite, second side (side B) of the module.

As mentioned, a standardized module such as M.2 can be used for different port types. However, different pins can have different functions based on the port type. In FIGS. 8A and 8B, the pinout includes columns C1-C13. C1 depicts the pin number.

C2 depicts the signals for a USB-A module. C3 depicts the IO direction as P, Bi (bidirectional) or O. C4 depicts whether high speed IO (HSIO) is used.

Column 5 depicts the signals for high bit rate (HBR) TBT module or USB-3 module. C6 depicts the IO direction. C7 depicts whether HSIO is used.

Column 8 depicts the signals for an HDMI module. C9 and C11 depict the IO direction. C10 and C12 depict whether HSIO is used.

C13 provides a description.

FIG. 8C depicts an example configuration of pins on a USB-C port. Pins A1-A12 extend across one side of the port in a first direction and pins B1-B12 extend across another side of the port in a second, opposite direction such that pins A1 and B12 are adjacent and A12 and B1 are adjacent, for example.

FIG. 8D depicts an example configuration of pins on an HDMI port. The odd-numbered pins 1-19 extend across one side of the port in a first direction, and the even-numbered pins 2-18 extend across another side of the port in the same first direction. TMDs refers to Transition Minimized Differential Signaling. CEC (Consumer Electronics Control) allows for HDMI devices to be controlled with one remote control. HEC refers to an HDMI Ethernet Channel. DDC refers to a Display Data Channel.

Figure 9:
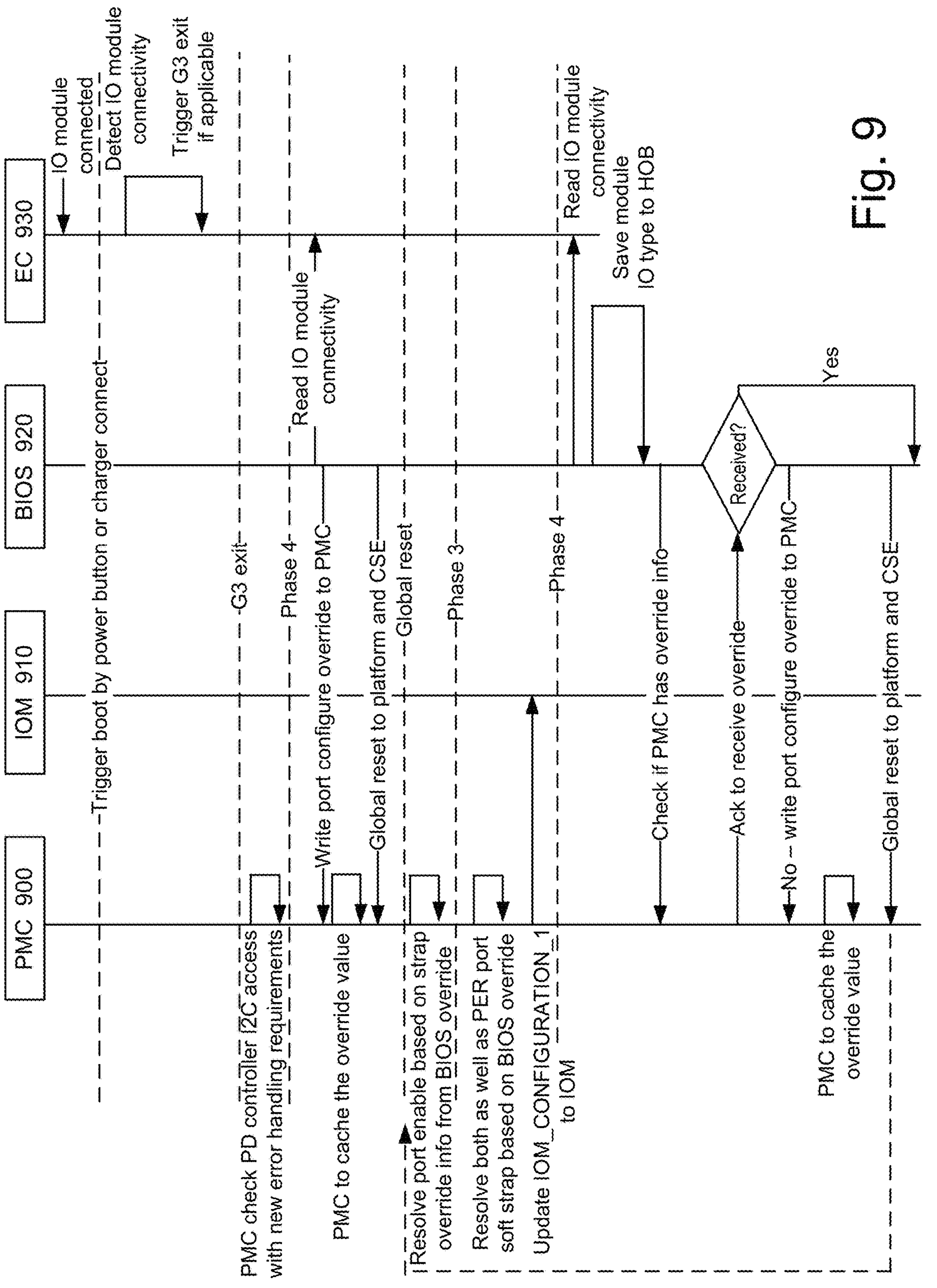
FIG. 9 depicts an example software flow for detecting a module in a computing system, in accordance with various embodiments.

FIG. 9 depicts an example software flow for detecting a module in a computing system, in accordance with various embodiments. The flow involves a power management controller (PMC) 900, input-output manager (IOM) 910, basic input-output system (BIOS) 920 and an embedded controller (EC) 930. The BIOS is a program in a computer's microprocessor uses to start the computer system after it is powered on. The flow proceeds time wise from top to bottom.

The power management controller (PMC) is responsible for platform-wide power management. On some Intel processors, it is on the Platform Controller Hub (PCH)

First, an IO module is connected. The process triggers a boot up of the computing device by a power button or a charger connection. Subsequently, the process detects the IO module connectivity and a G3 (mechanical off state) exit is triggered if applicable. Subsequently, the PMC checks the PD controller I2C access with new error handling requirements. Phase 4 of the boot process is then reached. The BIOS then reads the IO module connectivity and writes a port configure override to the PMC. The PMC caches the override value. The BIOS then performs a global reset of the platform and CSE, a Converged Security Engine.

The PMC then resolves the port enable based on strap override information form the BIOS override, after which a phase 3 of the boot process is reached. The PMC resolves port configuration information based on the dynamic override information obtained from BIOS post module detection. The PMC then updates IOM to TYPEC_CONFIGURATION, after which phase 4 is reached again. The BIOS reads the IO module connectivity from the EC, then saves the module IO type to a Hand Off Block (HOB). Subsequently, the BIOS checks to see if the PMC has override information. The PM responses with an acknowledgement (ack) to receive the override. If the ack is not received by the BIOS, it writes a port configure override to the PMC, and the PMC caches the override value. Subsequently, the BIOS performs a global reset to the platform and CSE. If the ack is received by the BIOS, the process ends.

The flow of the process can be further understood in the following detailed example.

1. Module can be connected to any port in the G3/PG3 state. The EC is to detect module connectivity
a. Modular card is inserted to the platform in G3/PG3.
b. Modules detect pin assert on platform translate to interrupt to EC from I/O expander (optional for hot plug detect).
c. EC reads the I/O expander status register and knows which slot module is inserted (optional for hot plug detect).
d. During G3/PG3 exit, EC to probe EEPROM module through I2C with fixed predefined addresses, 0xA0, 0XA1, 0XA2, 0XA3 and read port module configuration:
   1. If port 1: read EEPROM 0XA0
   2. If port2: read EEPROM 0XA1
   3. If port3: read EEPROM 0XA2
   4. If port4: read EEPROM 0XA3
e. Read 8-bit port config from EEPROM in the module.
   0x00=>Invalid
   0x01=>Type-A module
   0x02=>Type-C module
   0x03=>DP module
   0x04=>HDMI module
   0x05 to 0x07: Reserved Note: The EEPROM module for single module design would look as above (8 bit data). If the module has multiple port config in one, the EEPROM format can be modified accordingly.

2. EC provides module configuration to BIOS.

From port configuration read from EEPROM, EC detects module type connected to the port and pass the configuration to BIOS during every boot/reset via BIOS-EC ACPI 2 byte shared memory as below. Advanced Configuration and Power Interface (ACPI) is an architecture-independent power management and configuration framework that forms a subsystem within the host OS. This framework establishes a hardware register set to define power states (sleep, hibernate, wake, etc). The hardware register set can accommodate operations on dedicated hardware and general purpose hardware.

An example EC Type-C Module structure update is provided in FIG. 10. FIG. 10 depicts an example data structure used to detect a module type, in accordance with various embodiments.

3. Fixed port handing.

If some or all of the ports are fixed (non-modular IO port or fixed port on PCB) in the platform, then EC detection for these kinds of ports are not required as the port configuration is predefined (as per port type and capabilities) and port details/config can be provided thru a Firmware Interface Table (FIT) tool to BIOS. A Firmware Interface Table (FIT) is a data structure inside BIOS flash and includes multiple entries. Each entry defines the starting address and attributes of different components in the BIOS. The FIT resides in the BIOS Flash area and is located by a FIT pointer at physical address (4 GB-40 h). The FIT is generated at build time, based on the size and location of the firmware components.

Note: EC dynamic detection of modular IO ports using EEPROM and communicate the port config to BIOS is applicable only if the platform supports at least one modular IO.

4. EC/PMC to initialize and communicate with PD controllers if it's Type-C module. If the connected module is Type-C, then EC can communicate with PD controller for EC-PD initialization and further operation. Each module connector has exposed pin which shall have pre-configured I2C pullups on the mother board. Based on the port to which the module is inserted, due to predefined PU/PD, EC-PD I2C addresses get assigned automatically.
a. If module connected to port1: configure pd I2C for EC as 0x20,
b. If module connected to port2: configure pd I2C for EC as 0x24
c. If module connected to port3: configure pd I2C for EC as 0x21
d. If module connected to port4: configure pd I2C for EC as 0x25

Similarly, PMC-PD I2C address gets assigned based on the module slot it gets connected to.
a. If port 1: configure pd I2C for PMC as 0x20
b. If port 2: configure pd I2C for PMC as 0x24
c. If port 3: configure pd I2C for PMC as 0x21
d. If port 4: configure pd I2C for PMC as 0x25

5. BIOS to pass detected module config to PMC. BIOS to update "Port mask" and "Port configuration override" based on module connected to PMC. An example format of port configuration override is provided in FIG. 11. FIG. 11 depicts an example format of a port configuration override, in accordance with various embodiments.

FIG. 12 depicts an example CPU descriptor record, in accordance with various embodiments. This can include flash descriptor records.

6. PMC reads PORT configuration and Per port strap (PD controller) info through FIT Example 1: When all the Ports are Configured as Modular IO a. FIT tool shall expose all port as Type-C as depicted in FIG. 13.

FIG. 13 depicts an example of a FIT tool which exposes all ports as Type-C, in accordance with various embodiments.

b. FIT tool shall populate "Power Delivery PD controller Configuration" for all the ports. However, shall configure the Modular port configuration as "Disabled" (not enabled).

FIG. 14 depicts an example of an interface of a FIT tool which populates a Power Delivery (PD) Controller Configuration for all the ports, where all the ports, including the Type-C port 1, are not disabled, in accordance with various embodiments.

Example 2: When 2nd Port is Configured as Modular IO a. FIT tool shall expose all port as Type-C as depicted in FIG. 13.

b. FIT tool shall populate "Power Delivery PD controller Configuration" for all the ports as depicted in FIG. 15. However, shall configure the $2^{nd}$ port enable config to No. Note: This config will be overridden by BIOS only when Type-C module is connected during G3/PG3.

FIG. 15 depicts an example of an interface of a FIT tool which populates a Power Delivery (PD) Controller Configuration for all the ports, where the Type-C port 1 is enabled and the Type-C port 2 is disabled, in accordance with various embodiments.

c. PMC shall read the Port config from FIT tool and resolve TYPEC_CONFIGURATION_1 reg.
   i. Port fixed connection straps (PFIX_STRAP) (32-bits); write the 32-bit value, unchanged, directly to the IOM Type-C Configuration1 register (TYPEC-_CONFIGURATION_1)

d. PMC shall read USB-C Per Port Soft Strap from FIT tool.

FIG. 16 depicts an example of an interface of a FIT tool indicating a USB-C Per Port Soft Strap in accordance with various embodiments. Port Soft Strap refers to a USB-C Port related initialization configuration during boot.

7. BIOS writes Port configuration override to PMC
8. PMC shall cache the port configuration override update by BIOS across resets
9. BIOS shall trigger Global reset
10. PMC to resolve fixed configuration of port based on PFIX_STRAP as well as the PORT configuration override cached.
   a. If PORT configuration override is not present from BIOS. Consider PFIX_STRAP only to update TYPEC_CONFIGURATION_1
   b. Else, update TYPEC_CONFIGURATION_1 based on PORT override config from BIOS. See FIG. 17.

FIG. 17 depicts an example TYPEC_CONFIGURATION_1 data structure, in accordance with various embodiments.

11. PMC to resolve USB-C Per Port Soft-Strap: TypeC port Enabled field based on PORT configuration override from BIOS
   a. If override config indicate module connected to specific port is TypeC, then it shall set specific port mapping strap for "typeC port enabled" as 1.
   Post this update, PMC shall consider it as a TypeC port and shall access PD controller registers through the specific address read from FIT.
   Note: By default "typeC port enabled=0" when port is configured as modular. This is done to avoid, any fatal error due to PMC accessing PD controller I2C, when no module or fixed port module is connected.

Figure 18A:
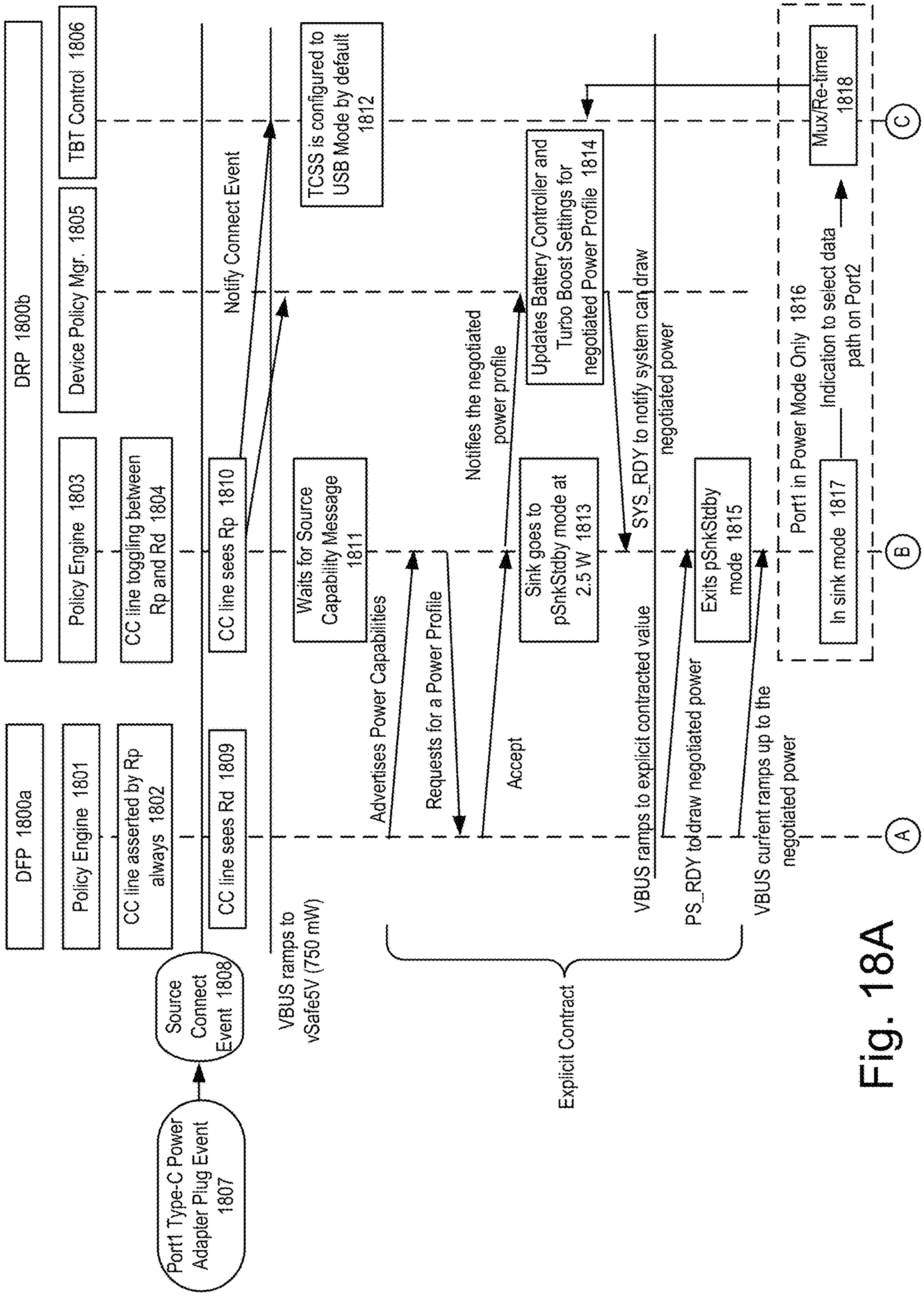
FIG. 18A depicts a first part of an example software flow in which a USB-C port 1 is in a power mode only, and a USB-C port 2, which uses DisplayPort-protocol-over-USB-C, is in a data mode only, consistent with FIG. 5, and in accordance with various embodiments.

FIG. 18A depicts a first part of an example software flow in which a USB-C port 1 is in a power mode only, and a USB-C port 2, which uses DisplayPort-protocol-over-USB-C, is in a data mode only, consistent with the module 440 of FIG. 4 and FIG. 5, and in accordance with various embodiments. Successive portions of the flow are depict in FIG. 18A to 18C.

The flow proceeds time wise from top to bottom.

There are three types of data flow in a USB connection. In the first type, the downstream-facing port (DFP) sends data downstream. It is typically the port on a host or a hub to which devices connect. A DFP will source VBUS power (the power path between host and device) and can also source VCONN power (to power electronically marked cables). An example of an application that may include a DFP is a docking station.

A second type is the upstream-facing port (UFP), which connects to a host or DFP of a hub, receives the data on a device or hub. These ports usually sink VBUS. An example of an application that may include a UFP is a display monitor.

A third type is a dual-role data (DRD) port which can operate as either a DFP (host) or a UFP (device). The port's power role at attach determines its initial role. A source port takes on the data role of a DFP, while the sink port takes on the data role of a UFP. Using USB PD data role swap can dynamically change the port's data role, however. Example applications include DRD ports include laptops, tablets and smartphones.

Additionally, there are three types of power flow in a USB connection.

In the first type, a sink is a port that when attached consumes power from VBUS and a sink is most often a device. A sink could include USB peripherals such as a USB powered light or fan.

In a second type, a source is a port that when attached provides power over VBUS. Common sources are a host or hub DFP. An example of a source application is a USB Type-C wall charger.

In a third type, a dual-role power (DRP) port can operate as either a sink or source, and may alternate between these two states. When a DRP initially operates as a source, the port takes the data role of a DFP. Alternatively, when a DRP initially operates as a sink, the port takes the data role of a UFP. Using USB PD power role swap can dynamically change the DRP's power role, however. For example, a laptop may include a DRP port that can receive power to charge the laptop's battery, but it can also deliver power to charge external accessories. Additionally, there are two special subclasses of a DRP.

In the first subclass, a sourcing device is capable of supplying power, but not capable of acting as a DFP. One example of this subclass is a USB Type-C and USB PD-compatible monitor that receives data from a laptop's DFP, but also charges the laptop.

In the second subclass, a sinking host is capable of consuming power, but not capable of acting as a UFP. An example could be a hub's DFP that sends data to an accessory while being powered by that accessory.

A downstream facing port (DFP), such as a host computer, exposes pull-up terminations, Rp, on its CC pins (CC1 and CC2). An upstream facing port (UFP), such as a peripheral, exposes pull-down terminations, Rd, on its CC pins. The purpose of Rp and Rd terminations on CC pins is to identify the DFP to UFP connection and the CC pin that will be used for communication. To do this, the DFP monitors both CC pins for a voltage lower than its unterminated voltage.

Figure 18B:
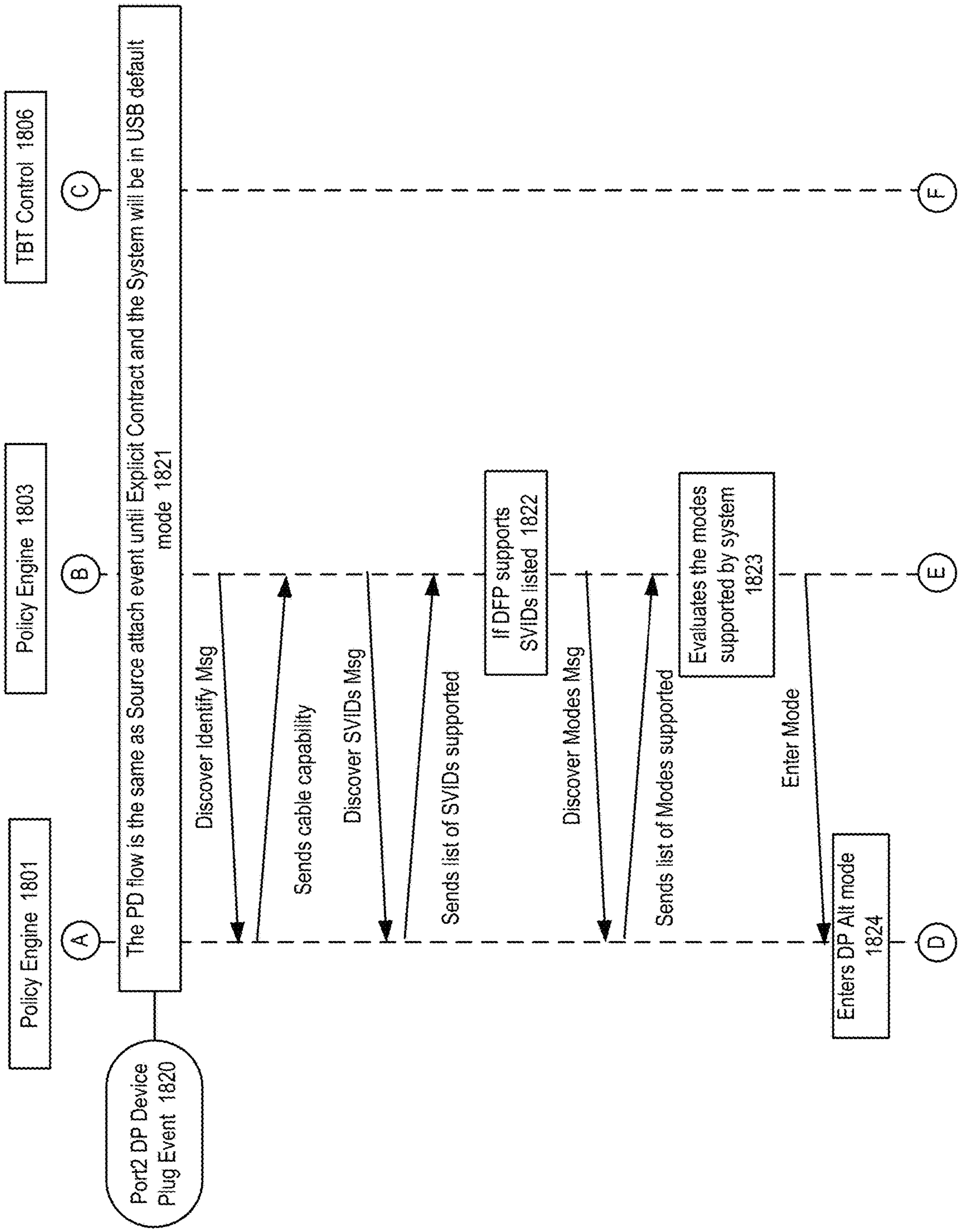
FIG. 18B depicts a second part of an example software flow which follows the flow of FIG. 18A, in accordance with various embodiments.
Figure 18C:
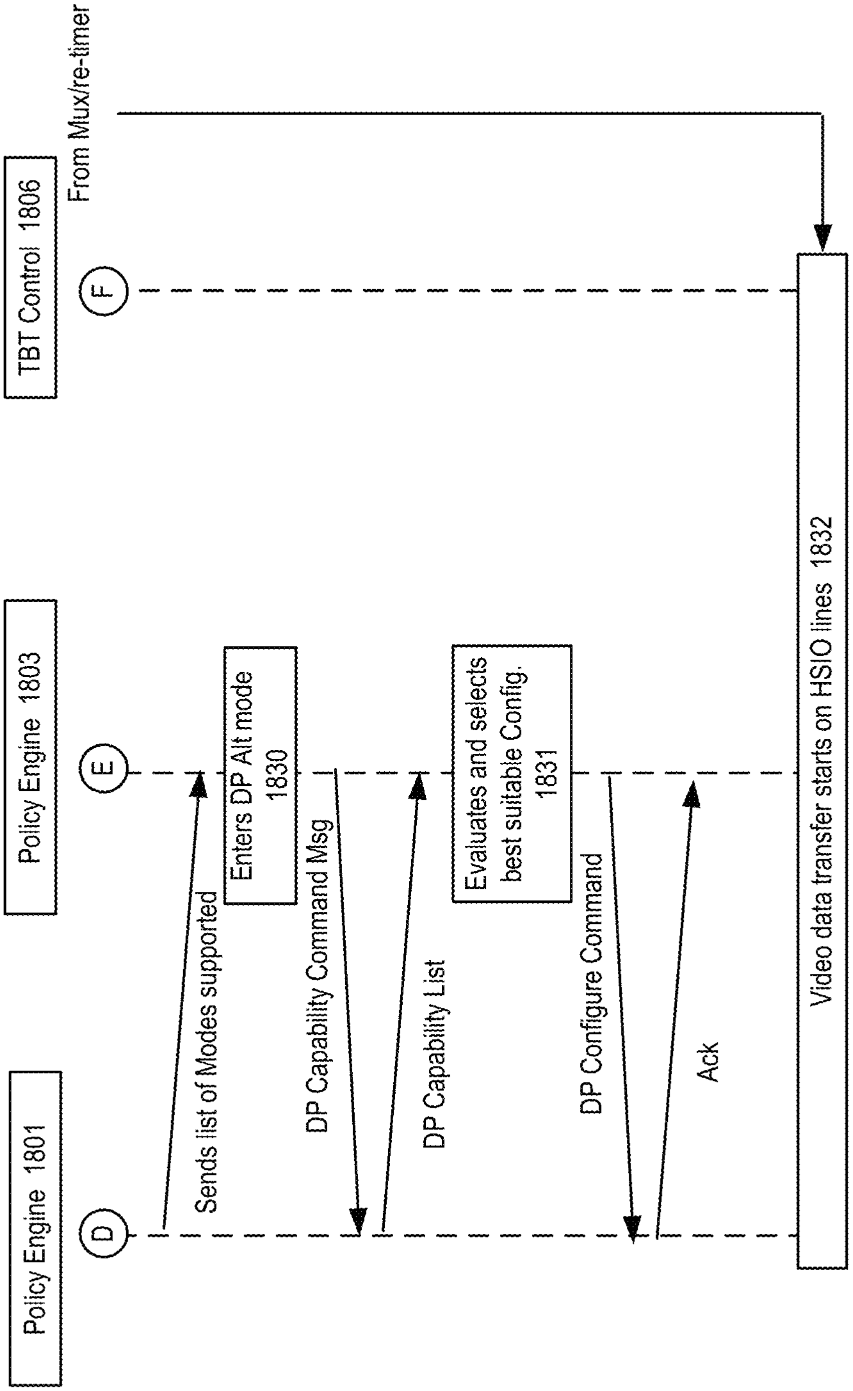
FIG. 18C depicts a third part of an example software flow which follows the flow of FIG. 18B, in accordance with various embodiments.

In the flow of FIG. 18A to 18C, a USB Type-C source power adapter is plugged in port-1 and the policy engine negotiates the power capabilities advertised. The explicit contract is ended with PS_RDY from the source and the VBUS ramps up to the negotiated power. PS_RDY is a USB Power Supply Ready Message sent by the Source to indicate its power supply has reached the desired operating condition. This in turn generates a source connect event.

Although the TBT controller is by default in USB mode, there is no data transfer on the lanes making them redundant. When the PD controller is in sink mode only on port-1, it indicates the MUX to switch the data lanes to port-2. This can happen, e.g., when there is nothing connected on port-2. A device only (UFP) is plugged in port 2, here DP device only is mentioned but the device can be a bus powered USB/TBT device. The explicit contract is established, and respective native/alternate mode is configured, and the data path is established.

In the example flow, for the DFP 1800*a*, a policy engine (block 1801) is implemented and the CC line is asserted by Rp (block 1802). For the DRP 1800*b*, a policy engine (block 1803) is implemented and the CC line toggles between Rp and Rd (block 1804). A device policy manager (block 1805) and a TBT control (block 1806) are also implemented.

Subsequently, a port-1 type-C power adapter plug event occurs (block 1807), e.g., when the USB-C power adapter 548 of FIG. 5 is plugged into the receptacle of the USB-C port1 448. This is followed by a source connect event (block 1808).

For the DFP, the CC lines sees Rd (block 1809) and for the DRP, the CC line sees Rp (block 1810). A connect event is notified to the TBT control and VBUS ramps to vSafe5V (750 mW). The policy engine 1803 waits for a source capability message (block 1811) while the TBT control is configured to USB mode by default (block 1812).

The policy engine 1801 advertises power capabilities to the policy engine 1803 and the policy engine 1803 responds with requests for a power profile. The policy engine 1801 accepts a request and the policy engine 1803 notifies the negotiated power profile to the device policy manager (block 1805). The sink goes to pSnkStdby mode at 2.5 W (block 1813) and the device policy manager 1805 updates the battery controller and turbo boost settings for the negotiated power profile (block 1814). The device policy manager uses SYS_RDY to notify the policy engine 1803 that the system can draw the negotiated power. In response, VBUS ramps to the explicit contracted value.

The policy engine 1801 then sends PS_RDY to the policy engine 1803 to draw the negotiated power. The policy engine 1803 exits the pSnkStdby mode at block 1815. The policy engine 1801 the causes the VBUS current to ramp up to the negotiated power. At block 1816, Port1 is in a power only mode. An in sink mode (block 1817) sends an indication to select data on Port2 to a mux/re-timer (block 1818). The process of block 1814 can follow. The processing of the policy engine 1801, policy engine 1803 and TBT control 1806 continues at steps A, B and C, respectively in FIG. 18B.

FIG. 18B depicts a second part of an example software flow which follows the flow of FIG. 18A, in accordance with various embodiments. a Port2 DP device plug event occurs at block 1820. At block 1821, the PD flow is the same as for the Source attach event in FIG. 18A until an Explicit Contract is obtained and the System will be in USB default mode.

Subsequently, the policy engine 1803 communicates a discover identity message to the policy engine 1801, which responds by sending a cable capability. The policy engine 1803 then communicates a discover SVIDs message to the policy engine 1801, which responds by sending a list of SVIDs supported. SVID refers to Standard or Vendor ID (SVID), which a unique 16-bit number assigned by the USB Implementers Forum. The SVID is used to identify alternate modes such as DisplayPort over USB-C or HDMI over USB-C. At block 1822, the policy engine 1803 determines whether the DFP supports the SVIDs listed.

The policy engine 1803 then communicates a discover modes message to the policy engine 1801, which responds by sending a list of modes supported. At block 1823, the policy engine evaluates the modes supported by the system. The policy engine then informs the policy engine 1801 to enter a mode. In the response, at block 1824, the policy engine 1801 enters the DP alt mode, for example, e.g., DP over USB-C.

The processing of the policy engine 1801, policy engine 1803 and TBT control 1806 continues at step D, E and F, respectively in FIG. 18C.

FIG. 18C depicts a third part of an example software flow which follows the flow of FIG. 18B, in accordance with various embodiments. The policy engine 1801 sends a list of modes supported to the policy engine 1803, which enters the DP alt mode, for example, at block 1830. The policy engine 1803 sends a DP compatibility command message to the policy engine 1801 which responds by returning a DP capability list. The policy engine 1803 evaluates and selects a best suitable configuration at block 1831 and sends a DP configure command to the policy engine 1801. The command is acknowledged (Ack) and block 1832 is reached, where video data transfer starts on the HSIO lines, e.g., path 443 in FIG. 4. The block 1832 can also be reached directly from the mux/re-timer of block 1818 of FIG. 18A.

FIG. 19A to 24B provide example configurations of a module as described herein. The module can have specified dimensions in a generally rectangular cross-section with plastic or metal enclosure, for example, although other form factors are possible. The module can have a custom PCB extended edge gold finger for HSIO (high-speed input/output lanes), LSIO (low-speed input/output lanes) and power connections from the laptop. The custom connector on the motherboard/module can be keyed, blocking the reverse plugging of the module. The module can be on an expansion card such as an M.2 card, in one possible approach.

Figure 19A:
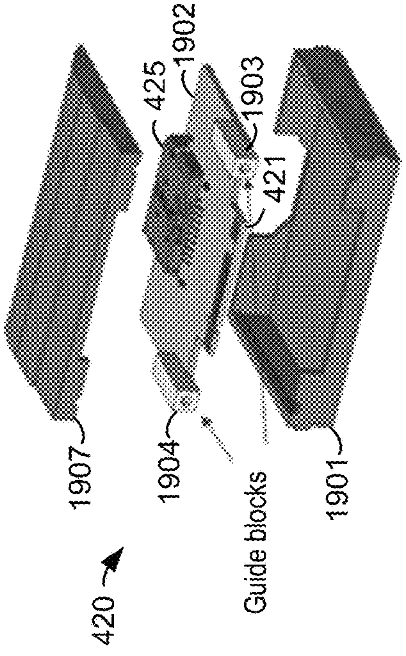
FIG. 19A depicts an exploded view of the HDMI module 420 of FIG. 4, in accordance with various embodiments.

FIG. 19A depicts an exploded view of the HDMI module 420 of FIG. 4, in accordance with various embodiments. This is an exploded view which depicts a top part 1907, a bottom part 1901 and circuit board 1902. The circuit board includes the HDMI port 425, the connector 421, and guide blocks 1903 and 1904 which assist in securing the module into a laptop, for example.

Figure 19B:
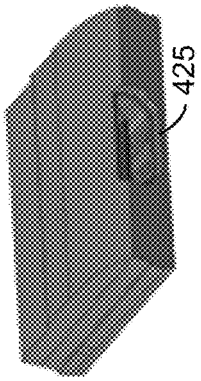
FIG. 19B depicts a front view of the HDMI module 420 of FIG. 19A, including the HDMI port 425, in accordance with various embodiments.

FIG. 19B depicts a front view of the HDMI module 420 of FIG. 19A, including the HDMI port 425, in accordance with various embodiments.

Figure 19C:
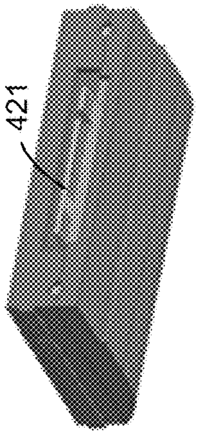
FIG. 19C depicts a rear view of the HDMI module 420 of FIG. 19A, including the connector 421 to connect to an expansion slot in a host platform, in accordance with various embodiments.

FIG. 19C depicts a rear view of the HDMI module 420 of FIG. 19A, including the connector 421 to connect to an expansion slot in a host platform, in accordance with various embodiments.

Figure 20A:
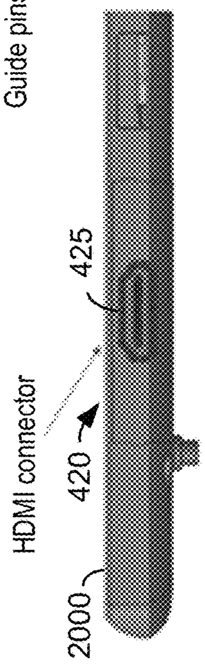
FIG. 20A depicts a side view of a laptop computer 2000 including the HDMI module 420 of FIG. 19A to 19C, in accordance with various embodiments.

FIG. 20A depicts a side view of a laptop computer 2000 including the HDMI module 420 of FIG. 19A to 19C, in accordance with various embodiments. The HDMI port 425 is visible and accessible at the side edge of the laptop.

Figure 20B:
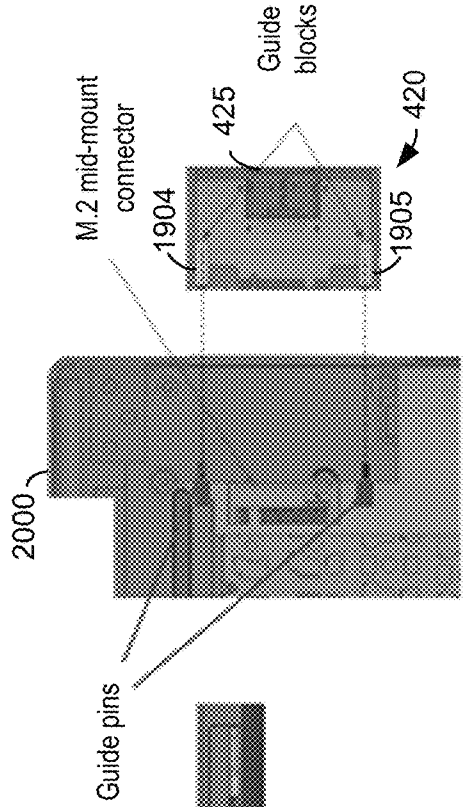
FIG. 20B depicts a top view of the laptop computer of FIG. 20A including an area in which the HDMI module 420 can be inserted, in accordance with various embodiments.

FIG. 20B depicts a top view of the laptop computer of FIG. 20A including an area in which the HDMI module 420 can be inserted, in accordance with various embodiments. The guide blocks 1904 and 1905 can align with respective guide pins to secure the module 420 in the laptop 2000.

Figure 20C:
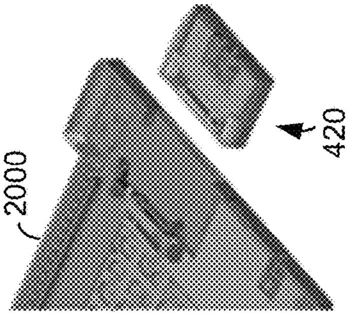
FIG. 20C depicts another view of the laptop computer 2000 of FIG. 20A including the area in which the HDMI module 420 can be inserted, in accordance with various embodiments.

FIG. 20C depicts another view of the laptop computer 2000 of FIG. 20A including the area in which the HDMI module 420 can be inserted, in accordance with various embodiments.

Figures 21A, 21B, 21C, 22A, 22B, 22C:
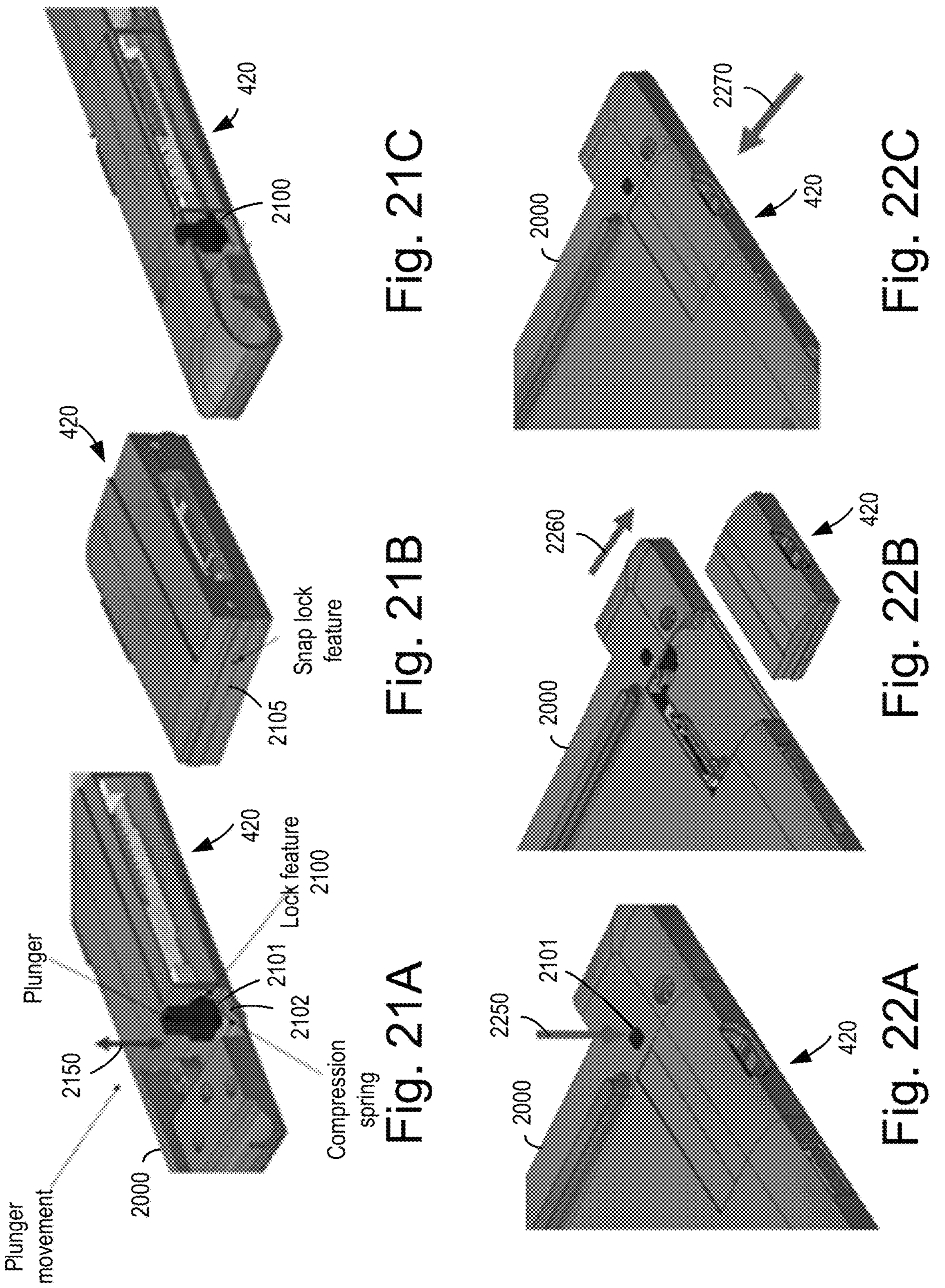
FIG. 21A depicts a view of a locking mechanism for the HDMI module 420, where the module is inserted into the laptop computer, in accordance with various embodiments.
FIG. 21B depicts a view of the module 420 of FIG. 21A in accordance with various embodiments.
FIG. 21C depicts another view of the module 420 and laptop computer 2000 of FIG. 21A, in accordance with various embodiments.
FIG. 22A depicts a bottom view of the laptop computer 2000, where the plunger 2101 is pressed to unlock the module 420 from the laptop computer, in accordance with various embodiments.
FIG. 22B depicts a bottom view of the laptop computer of FIG. 22A, where the module 420 is removed from the laptop computer, in accordance with various embodiments.
FIG. 22C depicts a bottom view of the laptop computer of FIG. 22A, where the module 420 is inserted into the laptop computer, in accordance with various embodiments.

FIG. 21A depicts a view of a locking mechanism for the HDMI module 420, where the module is inserted into the laptop computer, in accordance with various embodiments. A locking mechanism 2100 for the module includes a plunger 2101 and a compression spring 2102. The plunger moves in a direction indicated by an arrow 2150. When the plunger is depressed by the user, the module is released. At other times, the module is locked in.

FIG. 21B depicts a view of the module 420 of FIG. 21A in accordance with various embodiments. A snap lock feature 2105 at the edge of the module engages with the locking mechanism to lock the module in place.

FIG. 21C depicts another view of the module 420 and laptop computer 2000 of FIG. 21A, in accordance with various embodiments. Details of the locking mechanism 2100 are shown.

FIG. 22A depicts a bottom view of the laptop computer 2000, where the plunger 2101 is pressed to unlock the module 420 from the laptop computer, in accordance with various embodiments. The user presses the plunger in the direction of the arrow 2250 at the bottom of the laptop to release or unlock the module.

FIG. 22B depicts a bottom view of the laptop computer of FIG. 22A, where the module 420 is removed from the laptop computer, in accordance with various embodiments. The user pulls the module in the direction of the arrow 2260 to remove the module.

FIG. 22C depicts a bottom view of the laptop computer of FIG. 22A, where the module 420 is inserted into the laptop computer, in accordance with various embodiments. The user pushes the module in the direction of the arrow 2270 to install the module in the laptop.

Figure 23A:
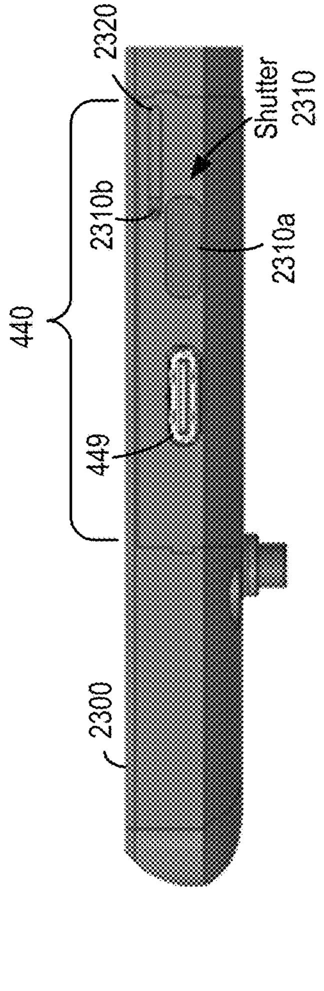
FIG. 23A depicts a side view of a laptop computer 2300 and the dual port module 440 consistent with FIGS. 4 and 5, where a first USB-C port 449 is accessible while a second USB-C port 448 is block by a shutter 2310, in accordance with various embodiments.

FIG. 23A depicts a side view of a laptop computer 2300 and the dual port module 440 consistent with FIGS. 4 and 5, where a first USB-C port 449 is accessible while a second USB-C port 448 is block by a shutter 2310, in accordance with various embodiments. In this approach, a shutter or door is provided which blocks access to the second port when it is not in use. For example, if the first port 449 is used for both power and data, this indicates the second port is not used. The shutter can be closed over the second port in this situation, in a first or closed position. If both ports are used, the shutter can be open, e.g., moved to a second or open position as in FIG. 23B, to allow access to the second port. The two ports are both used, as discussed, when data only is carried on one port and power only is carried on the other port. The shutter prevents the user from inserting a connector into the second port at an inappropriate time, resulting in a poor user experience.

In the closed position as shown, the shutter 2310 includes a portion 2310*a* which blocks the second port and a portion 2310*b* which extends in a slot 2320.

Figure 23B:
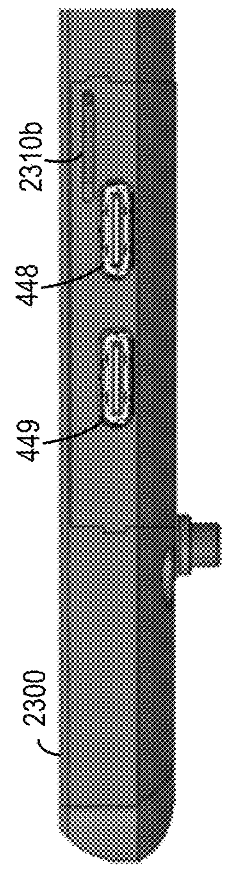
FIG. 23B depicts a side view of the laptop computer of FIG. 23A, where the second USB-C port is made accessible my moving the shutter, in accordance with various embodiments.

FIG. 23B depicts a side view of the laptop computer of FIG. 23A, where the second USB-C port 448 is made accessible by moving the shutter 2310, in accordance with various embodiments. The shutter moves to the right, to a second or open position, to expose the port 448. Only the portion 2310*b* of the shutter is visible in the slot. The port 449 remains accessible regardless of the position of the shutter, in one approach.

Figure 24A:
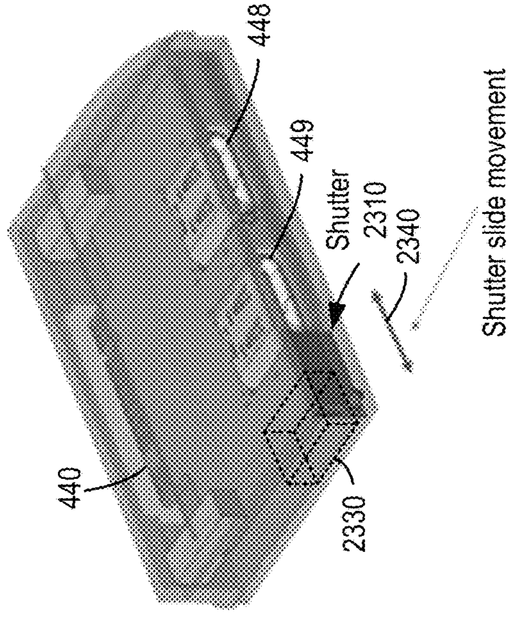
FIG. 24A depicts a sliding movement of the shutter 2310 of FIG. 23A, in accordance with various embodiments.

In one approach, depicts in FIG. 24A, a servo-motor is used to automatically open and close the shutter. In another approach, instead of a shutter, a component such as a light is used to inform the user of whether the second port can be used. For example, a red or green light may be turned on when the second port can or cannot, respectively, be used.

FIG. 24A depicts a sliding movement of the shutter 2310 of FIG. 23A, in accordance with various embodiments. A servo-motor 2330 is depicted in a simplified form to automatically move the shutter under the control of the module 440 or host platform. The shutter can move back and forth in a direction depicted by an arrow 2340.

Figure 24B:
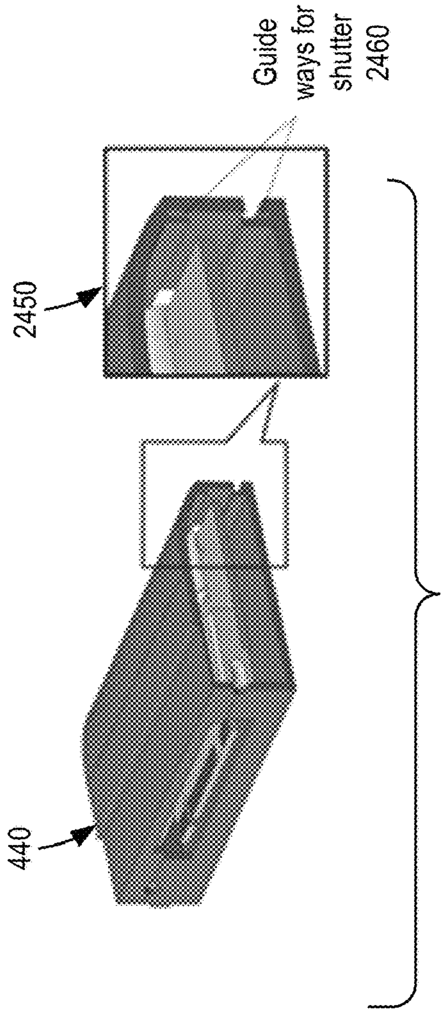
FIG. 24B depicts a view of the module 440 including guide ways 2460 for the shutter, in accordance with various embodiments.

FIG. 24B depicts a view of the module 440 including guide ways 2460 for the shutter, in accordance with various embodiments. An enlarged region 2450 shows the guide ways which may be formed as recessed regions which hold the shutter while allowing a sliding movement.

Figure 25:
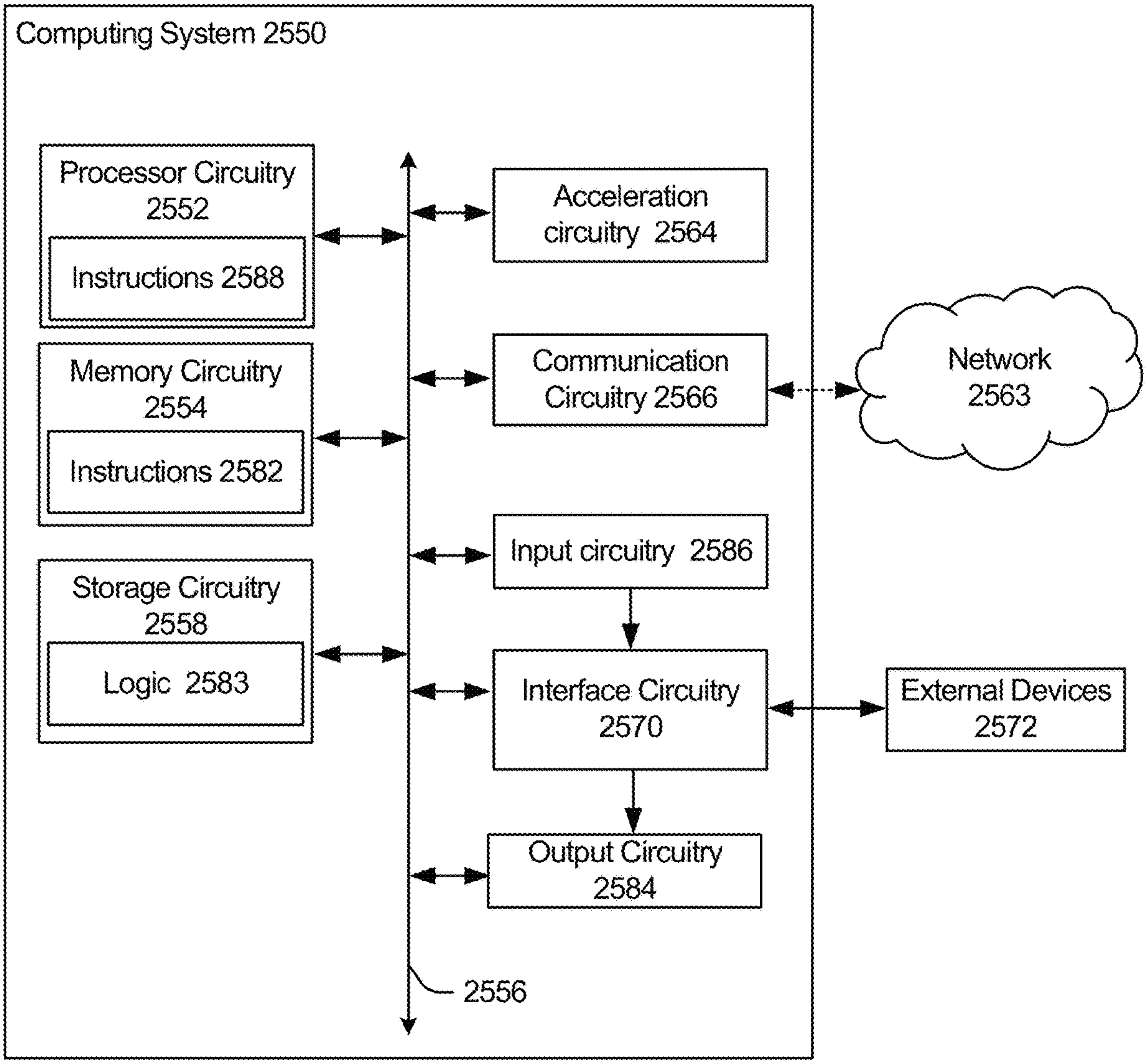
FIG. 25 illustrates an example of components that may be present in a computing system 1550 for implementing the techniques (e.g., operations, processes, methods, and methodologies) described herein.

FIG. 25 illustrates an example of components that may be present in a computing system 2550 for implementing the techniques (e.g., operations, processes, methods, and methodologies) described herein. The memory circuitry 2554 may store instructions and the processor circuitry 2552 may execute the instructions to perform the functions described herein including the processes of FIGS. 9 and 18A to 18C. The modules described herein can correspond to the interface circuitry 2570.

The computing system 2550 may include any combinations of the hardware or logical components referenced herein. The components may be implemented as ICs, portions thereof, discrete electronic devices, or other modules, instruction sets, programmable logic or algorithms, hardware, hardware accelerators, software, firmware, or a combination thereof adapted in the computing system 2550, or as components otherwise incorporated within a chassis of a larger system. For one embodiment, at least one processor 2552 may be packaged together with computational logic 2582 and configured to practice aspects of various example embodiments described herein to form a System in Package (SiP) or a System on Chip (SoC).

The system 2550 includes processor circuitry in the form of one or more processors 2552. The processor circuitry 2552 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2552 may include one or more hardware accelerators (e.g., same or similar to acceleration circuitry 2564), which may be microprocessors, programmable processing devices (e.g., FPGA, ASIC, etc.), or the like. The one or more accelerators may include, for example, computer vision and/or deep learning accelerators. In some implementations, the processor circuitry 2552 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 2552 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 2552 may be coupled with or may include memory/storage and may be configured to execute instructions stored in the memory/storage to enable various applications or operating systems to run on the platform 2550. The processors (or cores) 2552 is configured to operate application software to provide a specific service to a user of the platform 2550. In some embodiments, the processor(s) 2552 may be a special-purpose processor(s)/controller(s) configured (or configurable) to operate according to the various embodiments herein.

As examples, the processor(s) 2552 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2552 may be a part of a system on a chip (SoC), System-in-Package (SiP), a multi-chip package (MCP), and/or the like, in which the processor(s) 2552 and other components are formed into a single integrated circuit, or a single package, such as the Edison™ or Galileo™ SoC boards from Intel® Corporation. Other examples of the processor(s) 2552 are mentioned elsewhere in the present disclosure.

The system 2550 may include or be coupled to acceleration circuitry 2564, which may be embodied by one or more AI/ML accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 2564 may comprise logic blocks or logic fabric and other interconnected resources that may be programmed (configured) to perform various functions, such as the procedures, methods, functions, etc. of the various embodiments discussed herein. In such implementations, the acceleration circuitry 2564 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 2552 and/or acceleration circuitry 2564 may include hardware elements specifically tailored for machine learning and/or artificial intelligence (AI) functionality. In these implementations, the processor circuitry 2552 and/or acceleration circuitry 2564 may be, or may include, an AI engine chip that can run many different kinds of AI instruction sets once loaded with the appropriate weightings and training code. Additionally or alternatively, the processor circuitry 2552 and/or acceleration circuitry 2564 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 2552 and/or acceleration circuitry 2564 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of system 2550 may be operated by the respective AI accelerating co-processor(s), AI GPUs, TPUs, or hardware accelerators (e.g., FPGAs, ASICs, DSPs, SoCs, etc.), etc., that are configured with appropriate logic blocks, bit stream(s), etc. to perform their respective functions.

The system 2550 also includes system memory 2554. Any number of memory devices may be used to provide for a given amount of system memory. As examples, the memory 2554 may be, or include, volatile memory such as random access memory (RAM), static RAM (SRAM), dynamic RAM (DRAM), synchronous DRAM (SDRAM), RAMBUS® Dynamic Random Access Memory (RDRAM®), and/or any other desired type of volatile memory device. Additionally or alternatively, the memory 2554 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 2554 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 2558 provides persistent storage of information such as data, applications, operating systems and so forth. In an example, the storage 2558 may be implemented via a solid-state disk drive (SSDD) and/or high-speed electrically erasable memory (commonly referred to as "flash memory"). Other devices that may be used for the storage 2558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 2554 and/or storage circuitry 2558 may also incorporate three-dimensional (3D) cross-point (XPOINT) memories from Intel® and Micron®.

The memory circuitry 2554 and/or storage circuitry 2558 is/are configured to store computational logic 2583 in the form of software, firmware, microcode, or hardware-level instructions to implement the techniques described herein. The computational logic 2583 may be employed to store working copies and/or permanent copies of programming instructions, or data to create the programming instructions, for the operation of various components of system 2550 (e.g., drivers, libraries, application programming interfaces (APIs), etc.), an operating system of system 2550, one or more applications, and/or for carrying out the embodiments discussed herein. The computational logic 2583 may be stored or loaded into memory circuitry 2554 as instructions 2582, or data to create the instructions 2582, which are then accessed for execution by the processor circuitry 2552 to carry out the functions described herein. The processor circuitry 2552 and/or the acceleration circuitry 2564 accesses the memory circuitry 2554 and/or the storage circuitry 2558 over the interconnect (IX) 2556. The instructions 2582 direct the processor circuitry 2552 to perform a specific sequence or flow of actions, for example, as described with respect to flowchart(s) and block diagram(s) of operations and functionality depicted previously. The various elements may be implemented by assembler instructions supported by processor circuitry 2552 or high-level languages that may be compiled into instructions 2588, or data to create the instructions 2588, to be executed by the processor circuitry 2552. The permanent copy of the programming instructions may be placed into persistent storage devices of storage circuitry 2558 in the factory or in the field through, for example, a distribution medium (not shown), through a communication interface (e.g., from a distribution server (not shown)), over-the-air (OTA), or any combination thereof.

The IX 2556 couples the processor 2552 to communication circuitry 2566 for communications with other devices, such as a remote server (not shown) and the like. The communication circuitry 2566 is a hardware element, or collection of hardware elements, used to communicate over one or more networks 2563 and/or with other devices. In one example, communication circuitry 2566 is, or includes, transceiver circuitry configured to enable wireless communications using any number of frequencies and protocols such as, for example, the Institute of Electrical and Electronics Engineers (IEEE) 802.11 (and/or variants thereof), IEEE 802.23.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 2566 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others.

The IX 2556 also couples the processor 2552 to interface circuitry 2570 that is used to connect system 2550 with one or more external devices 2572. The external devices 2572 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 2550, which are referred to as input circuitry 2586 and output circuitry 2584. The input circuitry 2586 and output circuitry 2584 include one or more user interfaces designed to enable user interaction with the platform 2550 and/or peripheral component interfaces designed to enable peripheral component interaction with the platform 2550. Input circuitry 2586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2584 may be included to show information or otherwise convey information, such as sensor readings, actuator position(s), or other like information. Data and/or graphics may be displayed on one or more user interface components of the output circuitry 2584. Output circuitry 2584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 2550. The output circuitry 2584 may also include speakers and/or other audio emitting devices, printer(s), and/or the like. Additionally or alternatively, sensor(s) may be used as the input circuitry 2584 (e.g., an image capture device, motion capture device, or the like) and one or more actuators may be used as the output device circuitry 2584 (e.g., an actuator to provide haptic feedback or the like). Peripheral component interfaces may include, but are not limited to, a non-volatile memory port, a USB port, an audio jack, a power supply interface, etc. In some embodiments, a display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 2550 may communicate over the IX 2556. The IX 2556 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 2556 may be a proprietary bus, for example, used in a SoC based system.

The number, capability, and/or capacity of the elements of system 2550 may vary, depending on whether computing system 2550 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 2550 may comprise one or more components of a data center, a desktop computer, a workstation, a laptop, a smartphone, a tablet, a digital camera, a smart appliance, a smart home hub, a network appliance, and/or any other device/system that processes data.

The techniques described herein can be performed partially or wholly by software or other instructions provided in a machine-readable storage medium (e.g., memory). The software is stored as processor-executable instructions (e.g., instructions to implement any other processes discussed herein). Instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions.

The storage medium can be a tangible machine readable medium such as read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs)), among others.

The storage medium may be included, e.g., in a communication device, a computing device, a network device, a personal digital assistant, a manufacturing tool, a mobile communication device, a cellular phone, a notebook computer, a tablet, a game console, a set top box, an embedded system, a TV (television), or a personal desktop computer.

Some non-limiting examples of various embodiments are presented below.

Example 1 includes an apparatus, comprising: an expansion card; a port carried on the expansion card; a connector on the expansion card; and circuitry on the expansion card, wherein the circuitry is to communicate information to a host platform to identify a type of the port.

Example 2 includes the apparatus of Example 1, wherein the type of the IO port comprises Universal Serial Bus (USB) Type A, USB Type C, Thunderbolt, DisplayPort or High-Definition Multimedia Interface (HDMI).

Example 3 includes the apparatus of Example 1 or 2, wherein the circuitry is to communicate a module present signal to the host platform.

Example 4 includes the apparatus of any one of Examples 1 to 3, wherein the circuitry comprises a re-driver in a high-speed data path and an Electrically Erasable Programmable Read-Only Memory in a low speed data path.

Example 5 includes the apparatus of any one of Examples 1 to 4, wherein the circuitry comprises a re-timer in a high-speed data path and an Electrically Erasable Programmable Read-Only Memory in a low speed data path.

Example 6 includes the apparatus of any one of Examples 1 to 5, wherein the expansion card comprises an M.2 expansion card.

Example 7 includes the apparatus of any one of Examples 1 to 6, wherein the IO port is a first IO port on the expansion card, the apparatus further comprises a second IO port on the expansion card, and the circuitry comprises a multiplexer to couple at least one of the first IO port or the second IO port to the connector.

Example 8 includes the apparatus of Example 7, further comprising a servo motor on the expansion card, and a shutter coupled to the servo motor, the shutter is carried on guideways to move to a first position to block access to the second IO port when the first IO port but not the second IO port is coupled to the connector by the multiplexer, and to a second position to allow access to the second IO port when the first IO port and the second IO port are coupled to the connector by the multiplexer.

Example 9 includes the apparatus of any one of Examples 1 to 8, wherein the IO port is a first IO port on the expansion card, the apparatus further comprises a second IO port on the expansion card, and the circuitry comprises a multiplexer to couple the first IO port and the second IO port concurrently to the connector.

Example 10 includes the apparatus of Example 9, wherein the first IO port is to carry data but not power while the second IO port is to carry power but not data.

Example 11 includes the apparatus of any one of Examples 1 to 10, wherein the apparatus is a removable module of a computing device.

Example 12 includes a host platform, comprising: one or more processors; a connector; a serialization/deserialization path to couple the one or more processors to the connector; and low speed data and power paths to couple the one or more processors to the connector, wherein the one or more processors are to receive an identification of a type of input-output (IO) port on a module and to communicate with the module via the connector according to the type of IO port.

Example 13 includes the host platform of Example 12, wherein the one or more processor are to communicate with the module based on an assignment of signals to pins of the module, the assignment is based on the type of the IO port.

Example 14 includes the host platform of Example 12 or 13, wherein the module is among a plurality of modules coupled to the host platform, and for each module of the plurality of modules, the one or more processors are to receive an identification of a type of IO port on the module and to communicate with the module via the connector according to the identification of the type of the IO port.

Example 15 includes the host platform of Example 14, wherein each module of the plurality of modules has a different assignment of signals to pins of the module, and for each module of the plurality of modules, the one or more processors are to communicate with the module via the connector according to the assignment of signals to pins of the module.

Example 16 includes the host platform of any one of Examples 12 to 15, wherein, wherein the IO port is a first IO port on the module, the module further includes a second IO port, and the one or are processors are to concurrently receive power from the first IO port via the connector and transmit data to the second IO port via the connector.

Example 17 includes the host platform of any one of Examples 12 to 16, wherein, the one or more processors are to communicate high speed data to the IO port via the serialization/deserialization path.

Example 18 includes a computing device, comprising: a host platform; and a plurality of modules, wherein: each module of the plurality of modules comprises an expansion card plugged into the host platform, an input-output (IO) port carried on the expansion card and circuitry carried on the expansion card; each IO port is of a different type; and the host platform is to communicate with each IO port according to the type of the IO port.

Example 19 includes the computing device of Example 18, wherein: each expansion card comprises a connector; the connectors of the expansion cards have a common number of pins and a different assignment of signals and functions to pins according to the type of the IO port carried on the expansion card; and for each expansion card, the host platform is to communicate with the IO port via the connector according to the assignment of signals and functions to pins of the connector.

Example 20 includes the computing device of Example 18 or 19, wherein one module of the plurality of modules comprises a first Universal Serial Bus (USB) port and a second USB port, and the host platform is to receive power from the first USB port while transmitting DisplayPort-over-USB-C data via the second USB port.

In the present detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
an expansion card;
an input-output (IO) port carried on the expansion card;
a connector on the expansion card; and
circuitry on the expansion card, wherein the circuitry is to communicate information to a host platform to identify a type of the IO port; wherein:
the IO port is a first IO port on the expansion card, the apparatus further comprises a second IO port on the expansion card, and the circuitry comprises a multiplexer to couple the first IO port and the second IO port concurrently to the connector; and
the first IO port is to carry data but not power while the second IO port is to carry power but not data.

2. The apparatus of claim 1, wherein the type of the IO port comprises Universal Serial Bus (USB) Type A, USB Type C, Thunderbolt, DisplayPort or High-Definition Multimedia Interface (HDMI).

3. The apparatus of claim 1, wherein the circuitry is to communicate a module present signal to the host platform.

4. The apparatus of claim 1, wherein the circuitry comprises a re-driver in a high-speed data path and an Electrically Erasable Programmable Read-Only Memory in a low speed data path.

5. The apparatus of claim 1, wherein the circuitry comprises a re-timer in a high-speed data path and an Electrically Erasable Programmable Read-Only Memory in a low speed data path.

6. The apparatus of claim 1, wherein the expansion card comprises an M.2 expansion card.

7. The apparatus of claim 1, further comprising a servo motor on the expansion card, and a shutter coupled to the servo motor, the shutter is carried on guideways to move to a first position to block access to the second IO port when the first IO port but not the second IO port is coupled to the connector by the multiplexer, and to a second position to allow access to the second IO port when the first IO port and the second IO port are coupled to the connector by the multiplexer.

8. The apparatus of claim 1, wherein the apparatus is a removable module of a computing device.

9. The apparatus of claim 1, wherein first and second IO ports comprise Universal Serial Bus (USB) ports.

10. The apparatus of claim 1, wherein first IO port is coupled to a power adapter and the second IO port is coupled to a monitor.

11. The apparatus of claim 1, wherein first IO port is coupled to a Universal Serial Bus (USB) Type-C power adapter and the second IO port is coupled to a DisplayPort over USB Type-C monitor.

12. A host platform, comprising:
one or more processors;
a connector; and
a serialization/deserialization path to couple the one or more processors to the connector; and
low speed data and power paths to couple the one or more processors to the connector, wherein the one or more processors are to receive an identification of a type of input-output (IO) port on a module and to communicate with the module via the connector according to the type of IO port, wherein the IO port is a first IO port on the module, the module further includes a second IO port and a multiplexer to couple the first IO port and the second IO port concurrently to the connector, and the one or are processors are to concurrently receive power from the first IO port via the connector and the multiplexer and transmit data to the second IO port via the connector and the multiplexer.

13. The host platform of claim 12, wherein the one or more processor are to communicate with the module based on an assignment of signals to pins of the module, the assignment is based on the type of the IO port.

14. The host platform of claim 12, wherein the module is among a plurality of modules coupled to the host platform, and for each module of the plurality of modules, the one or more processors are to receive an identification of a type of IO port on the module and to communicate with the module via the connector according to the identification of the type of the IO port.

15. The host platform of claim 14, wherein each module of the plurality of modules has a different assignment of signals to pins of the module, and for each module of the plurality of modules, the one or more processors are to communicate with the module via the connector according to the assignment of signals to pins of the module.

16. The host platform of claim 12, wherein the one or more processors are to communicate high speed data to the IO port via the serialization/deserialization path.

17. The host platform of claim 12, wherein the type of the IO port comprises Universal Serial Bus (USB) Type A, USB Type C, Thunderbolt, DisplayPort or High-Definition Multimedia Interface (HDMI).

18. The host platform of claim 12, wherein first IO port is coupled to a Universal Serial Bus (USB) power adapter and the second IO port is coupled to a USB monitor.

19. A computing device, comprising:
a host platform; and
a plurality of modules, wherein:
each module of the plurality of modules comprises an expansion card plugged into the host platform, an input-output (IO) port carried on the expansion card and circuitry carried on the expansion card;
each IO port is of a different type; and the host platform is to communicate with each IO port according to the type of the IO port, wherein one module of the plurality of modules comprises a first Universal Serial Bus (USB) port, a second USB port, and a multiplexer coupled to the first and second USB ports, and the host platform is to receive power from the first USB port and the multiplexer while transmitting DisplayPort-over-USB-C data via the second USB port and the multiplexer.

20. The computing device of claim 19, wherein:

each expansion card comprises a connector;

the connectors of the expansion cards have a common number of pins and a different assignment of signals and functions to pins according to the type of the IO port carried on the expansion card; and for each expansion card, the host platform is to communicate with the IO port via the connector according to the assignment of signals and functions to pins of the connector.

* * * * *